United States Patent
Tanabe

(10) Patent No.: US 9,595,838 B2
(45) Date of Patent: Mar. 14, 2017

(54) ELECTRONIC APPARATUS, CONTROL METHOD AND RECORDING MEDIUM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/758,738

(22) Filed: Feb. 4, 2013

(65) Prior Publication Data

US 2013/0200843 A1    Aug. 8, 2013

(30) Foreign Application Priority Data

Feb. 6, 2012   (JP) ................. 2012-023341

(51) Int. Cl.
| | |
|---|---|
| H01J 7/00 | (2006.01) |
| H02J 7/00 | (2006.01) |
| H04B 5/00 | (2006.01) |
| H02J 7/02 | (2016.01) |
| H02J 5/00 | (2016.01) |

(52) U.S. Cl.
CPC ........... *H02J 7/0042* (2013.01); *H02J 7/025* (2013.01); *H04B 5/0037* (2013.01); *H02J 5/005* (2013.01); *H02J 7/0044* (2013.01); *H02J 7/0047* (2013.01); *H02J 7/0052* (2013.01); *H02J 2007/0001* (2013.01); *H02J 2007/0062* (2013.01); *H02J 2007/0096* (2013.01); *Y02T 10/7005* (2013.01); *Y02T 90/121* (2013.01); *Y02T 90/122* (2013.01)

(58) Field of Classification Search
CPC ........ H02J 7/025; Y02T 90/122; B60L 11/182
USPC .......................................... 320/108, 114, 162
See application file for complete search history.

(56) References Cited

U.S. PATENT DOCUMENTS

| | | | |
|---|---|---|---|
| 6,003,777 A | 12/1999 | Kowalski | |
| 7,772,802 B2 * | 8/2010 | Manico et al. | 320/108 |
| 8,385,822 B2 * | 2/2013 | Chatterjee et al. | 455/41.1 |
| 8,399,846 B2 * | 3/2013 | Niekawa et al. | 250/370.08 |
| 8,766,592 B2 * | 7/2014 | Fujita | 320/108 |
| 8,836,279 B2 * | 9/2014 | Nakano | 320/108 |
| 8,933,594 B2 * | 1/2015 | Kurs et al. | 307/326 |
| 8,963,487 B2 * | 2/2015 | Fukaya | 320/108 |
| 9,018,900 B2 * | 4/2015 | Yamamoto | H02J 7/025 320/108 |
| 2006/0279253 A1 * | 12/2006 | Kawai | 320/114 |
| 2007/0243901 A1 | 10/2007 | Cho | |
| 2008/0054721 A1 | 3/2008 | Frew | |

(Continued)

FOREIGN PATENT DOCUMENTS

| | | |
|---|---|---|
| CN | 101567579 A | 10/2009 |
| CN | 201466761 A | 5/2010 |

(Continued)

*Primary Examiner* — Helen Rossoshek
(74) *Attorney, Agent, or Firm* — Canon U.S.A., Inc. IP Division

(57) ABSTRACT

An electronic apparatus includes a power receiving unit that receives power from a power transmitting apparatus wirelessly, a connection unit that connects an external apparatus, a detection unit that detects power received by the power receiving unit, and a control unit that changes a mode of the electronic apparatus to a first mode after the detection unit detects that power received by the power receiving unit is equal to or lower than a predetermined value if the electronic apparatus is in a second mode.

18 Claims, 6 Drawing Sheets

(56) References Cited

U.S. PATENT DOCUMENTS

| | | | |
|---|---|---|---|
| 2009/0140690 A1* | 6/2009 | Jung | 320/108 |
| 2010/0033018 A1 | 2/2010 | Fukasawa | |
| 2010/0181961 A1* | 7/2010 | Novak et al. | 320/108 |
| 2011/0050164 A1* | 3/2011 | Partovi et al. | 320/108 |
| 2011/0179292 A1 | 7/2011 | Clegg | |
| 2011/0202777 A1* | 8/2011 | Hijazi | G06F 1/263 713/300 |
| 2011/0291613 A1 | 12/2011 | Rosik | |
| 2012/0001591 A1* | 1/2012 | Fukaya | 320/108 |
| 2012/0133335 A1* | 5/2012 | Tanabe | 320/137 |
| 2012/0146577 A1* | 6/2012 | Tanabe | 320/108 |
| 2012/0161697 A1* | 6/2012 | Park | G06F 1/263 320/108 |
| 2013/0033235 A1* | 2/2013 | Fukaya | 320/162 |
| 2013/0082648 A1* | 4/2013 | Kamata | 320/108 |
| 2013/0093388 A1* | 4/2013 | Partovi | 320/108 |
| 2013/0193756 A1* | 8/2013 | Fukaya | 307/29 |
| 2013/0207602 A1* | 8/2013 | Fukaya | 320/108 |
| 2013/0300355 A1* | 11/2013 | Jung | 320/108 |
| 2013/0342160 A1* | 12/2013 | Tanabe | 320/108 |
| 2014/0111156 A1* | 4/2014 | Lee et al. | 320/108 |
| 2014/0210404 A1* | 7/2014 | Lin | 320/108 |
| 2014/0225558 A1* | 8/2014 | Park | H02J 7/025 320/108 |
| 2015/0022145 A1* | 1/2015 | Kim et al. | 320/108 |
| 2016/0021531 A1* | 1/2016 | Kim | H04W 12/06 455/411 |

FOREIGN PATENT DOCUMENTS

| | | |
|---|---|---|
| CN | 102035220 A | 4/2011 |
| CN | 102074987 A | 5/2011 |
| EP | 2421116 A2 | 2/2012 |
| EP | 2472353 A1 | 7/2012 |
| JP | 2007-336710 A | 12/2007 |
| JP | 2008-067532 A | 3/2008 |
| WO | 2008/044297 A1 | 4/2008 |

* cited by examiner

ELECTRONIC APPARATUS, CONTROL METHOD AND RECORDING MEDIUM

BACKGROUND OF THE INVENTION

Field of the Invention

The present invention relates to electronic apparatuses.

Description of the Related Art

In recent years, a system has been known which includes a charger having a primary coil for outputting power by wireless without connection with a connector and a cellular phone having a secondary coil for receiving power supplied from the charger by wireless.

Japanese Patent Laid-Open No. 2008-67532 discloses a cellular phone which receives supply of power from an AC adapter when connected to the AC adapter and receives supply of power from a charger when inserted to the charger.

Conventionally, when an AC adapter and a cellular phone are connected and the cellular phone is inserted to a charger, the cellular phone may receive supply of power from the AC adapter and the charger. In this case, an excessive amount of power may possibly be supplied to the cellular phone. In order for the cellular phone to receive power from one of the AC adapter and the charger, the cellular phone is required to select one of the AC adapter and charger.

Accordingly, when power is supplied from a plurality of apparatuses to an electronic apparatus, the present invention allows selection of an apparatus to supply power to the electronic apparatus from the plurality of apparatuses.

SUMMARY OF THE INVENTION

According to an aspect of the present invention, there is provided an electronic apparatus including a power receiving unit that receives power from a power transmitting apparatus wirelessly, a connection unit that connects an external apparatus, a detection unit that detects power received by the power receiving unit, and a control unit that changes a mode of the electronic apparatus to a first mode after the detection unit detects that power received by the power receiving unit is equal to or lower than a predetermined value if the electronic apparatus is in a second mode, wherein the first mode is used for performing at least one of a predetermined process and a charging process using power received from the external apparatus, and the second mode is used for performing at least one of the predetermined process and the charging process using power received from the power transmitting apparatus.

According to another aspect of the present invention, there is provided a control method for controlling an electronic apparatus, wherein the electronic apparatus has a connection unit that connects an external apparatus, the control method including receiving power from a power transmitting apparatus wirelessly, detecting power received from the power transmitting apparatus, changing a mode of the electronic apparatus to a first mode after power received from the power transmitting apparatus becomes equal to or lower than a predetermined value if the electronic apparatus is in a second mode, wherein the first mode is used for performing at least one of a predetermined process and a charging process using power received from the external apparatus, and the second mode is used for performing at least one of the predetermined process and the charging process using power received from the power transmitting apparatus.

According to another aspect of the present invention, there is provided a computer-readable recording medium that stores a program for causing a computer to execute a control method for controlling an electronic apparatus, wherein the electronic apparatus has a connection unit that connects an external apparatus, the control method including receiving power from a power transmitting apparatus wirelessly, detecting power received from the power transmitting apparatus, and changing a mode of the electronic apparatus to a first mode after power received from the power transmitting apparatus becomes equal to or lower than a predetermined value if the electronic apparatus is in a second mode, wherein the first mode is used for performing at least one of a predetermined process and a charging process using power received from the external apparatus, and the second mode is used for performing at least one of the predetermined process and the charging process using power received from the power transmitting apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

First Embodiment

Figure 1:
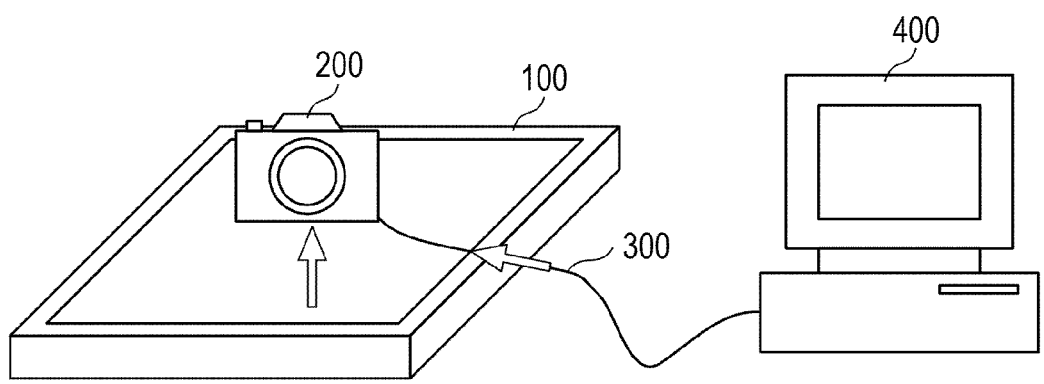
FIG. 1 illustrates an example of a power transmitting system according to a first embodiment.

Hereinafter, a first embodiment of the present invention will be described in detail with reference to drawings. A power transmitting system according to the first embodiment includes a power transmitting apparatus 100 and an electronic apparatus 200, as illustrated in FIG. 1. In the power transmitting system according to the first embodiment, when the distance between the power transmitting apparatus 100 and the electronic apparatus 200 falls within a predetermined range, the power transmitting apparatus 100 transmits power to the electronic apparatus 200 by wireless. When the distance between the power transmitting apparatus 100 and the electronic apparatus 200 falls within a predetermined range, the electronic apparatus 200 receives power output from the power transmitting apparatus 100 by wireless. When the distance between the power transmitting apparatus 100 and the electronic apparatus 200 does not fall within the predetermined range, the electronic apparatus 200 is not capable of receiving power from the power transmitting apparatus 100. The term "predetermined range" refers to a range where the power transmitting apparatus 100 and the electronic apparatus 200 are communicable. The power transmitting apparatus 100 may supply power to a plurality of electronic apparatuses in parallel.

The electronic apparatus 200 illustrated in FIG. 1 receives supply of power from an external apparatus 400 via a cable 300. In this case, the electronic apparatus 200 receives supply of power from the power transmitting apparatus 100 by wireless and receives supply of power from an external apparatus 400 via the cable 300. The cable 300 is a predetermined interface compliant with the Universal Serial Bus (USB) standard in description of the first embodiment below.

The electronic apparatus 200 may be an image pickup apparatus such as a camera or may be a reproducing apparatus which reproduces sound data and/or video data.

Alternatively, the electronic apparatus 200 may be a mobile apparatus such as a cellular phone or a smart phone. The electronic apparatus 200 may be battery pack containing a battery 211.

Alternatively, the electronic apparatus 200 may be an apparatus such as a vehicle to be driven by power supplied from the power transmitting apparatus 100. The electronic apparatus 200 may be an apparatus which may receive television broadcasting, a display which may display video data or a personal computer. The electronic apparatus 200 without connecting the battery 211 may operate by using power supplied from the power transmitting apparatus 100.

The external apparatus 400 may be a personal computer or a television, for example. The external apparatus 400 may be a USB host.

Figure 2:
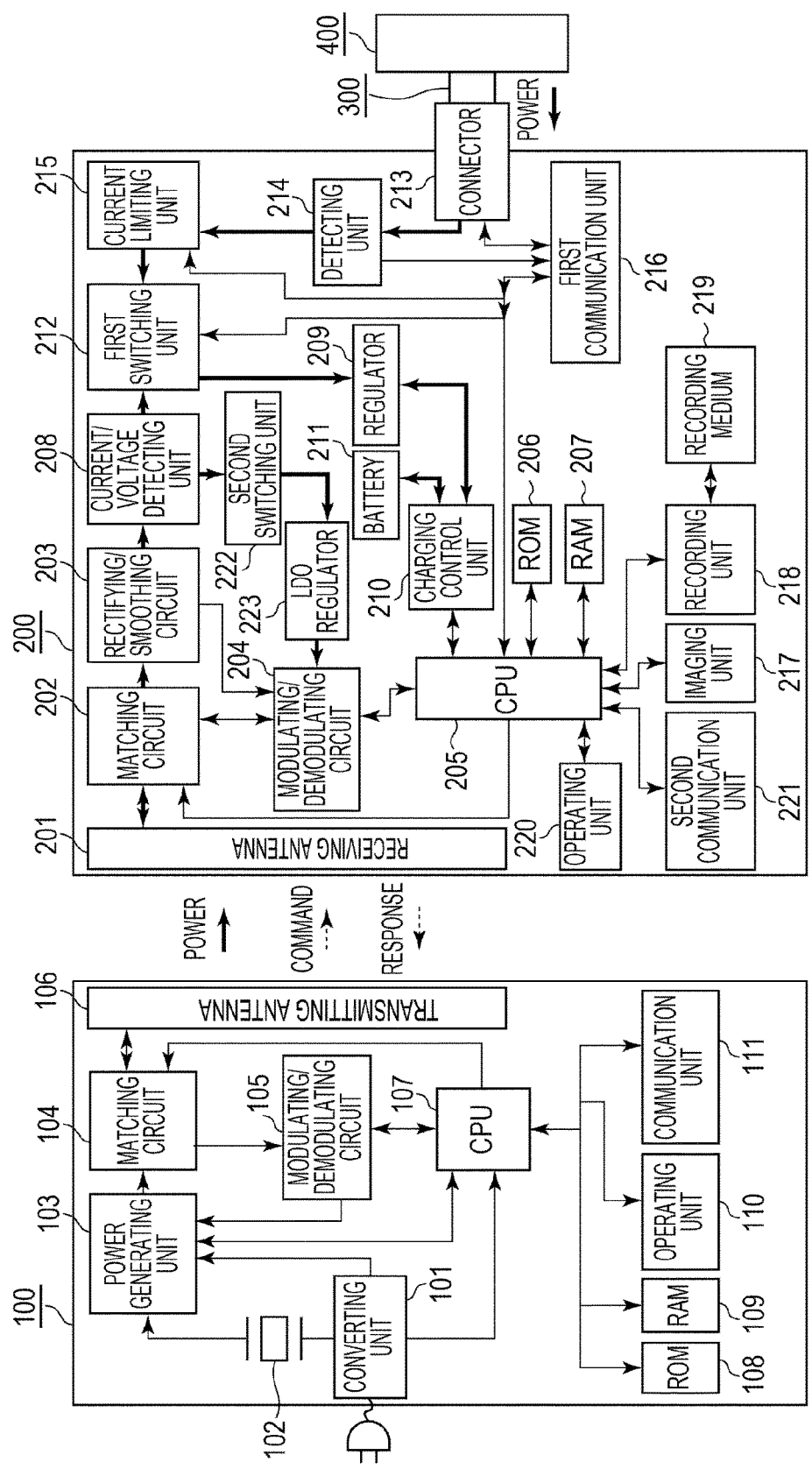
FIG. 2 is a block diagram illustrating an example of a power transmitting system according to the first embodiment.

FIG. 2 illustrates a block diagram of a power transmitting system according to the first embodiment. The power transmitting apparatus 100, as illustrated in FIG. 2, has a converting unit 101, an oscillator 102, a power generating unit 103, a matching circuit 104, a modulating/demodulating circuit 105, a power transmitting antenna 106, a CPU 107, a ROM 108, a RAM 109, an operating unit 110 and a communication unit 111.

When an AC power supply, not illustrated, and the power transmitting apparatus 100 are connected, the converting unit 101 converts alternating current power supplied from an AC power supply not illustrated to direct current power and supplies the converted direct current power to the power transmitting apparatus 100.

The oscillator 102 oscillates a frequency to be used for controlling the power generating unit 103 such that the power supplied from the converting unit 101 may be converted to power corresponding to a desired value set by the CPU 107. The oscillator 102 may be a quartz resonator, for example.

The power generating unit 103 generates power to be output to the outside through the power transmitting antenna 106 on the basis of the power supplied from the converting unit 101 and the frequency oscillated by the oscillator 102. The power generating unit 103 internally contains an FET, for example, and controls current flowing between internal source and drain terminals of the internal FET in accordance with the frequency oscillated by the oscillator 102 and generates power to be output to the outside. The power generated by the power generating unit 103 is supplied to the matching circuit 104. The power generating unit 103 may generate first power and second power.

The first power is supplied to the electronic apparatus 200 when the power transmitting apparatus 100 communicates with the electronic apparatus 200 by wireless. The second power is supplied to the electronic apparatus 200 when the power transmitting apparatus 100 transmits power to the electronic apparatus 200. For example, the first power may be power of 1 W or lower, and the second power may be power of 2 W to 10 W. The second power may be power of 10 W or higher. The second power may include power that causes the electronic apparatus 200 to charge the battery 211. The second power further includes power that causes the electronic apparatus 200 to operate. It is assumed here that the first power is lower than the second power. The first power is not limited to power of 1 W or lower if it is power to be used by the power transmitting apparatus 100 for wireless communication.

While the power transmitting apparatus 100 is supplying the first power to the electronic apparatus 200, the power transmitting apparatus 100 may perform a wireless communication compliant with the Near Field Communication (NFC) standard with the electronic apparatus 200 through the power transmitting antenna 106. On the other hand, while the power transmitting apparatus 100 is supplying the second power to the electronic apparatus 200, the power transmitting apparatus 100 is disabled to perform a wireless communication compliant with the NFC standard with the electronic apparatus 200 through the power transmitting antenna 106.

In order to supply the first power to the electronic apparatus 200, the power transmitting apparatus 100 transmits first power information indicating a value of the first power to the electronic apparatus 200 in accordance with the wireless communication compliant with the NFC standard. In order to supply the second power to the electronic apparatus 200, the power transmitting apparatus 100 transmits second power information indicating a value of the second power to the electronic apparatus 200 in accordance with the wireless communication compliant with the NFC standard before outputting the second power.

The matching circuit 104 is a resonance circuit for generating resonance between the power transmitting antenna 106 and a power receiving antenna included in an apparatus corresponding to the power transmitting apparatus 100 based on a frequency oscillated by the oscillator 102. The matching circuit 104 is a circuit for performing impedance matching between the power generating unit 103 and the power transmitting antenna 106. The matching circuit 104 may include a variable capacitor, a variable coil and a resistance. The CPU 107 is capable of controlling a resonance frequency f of the power transmitting apparatus 100 by changing the value of capacitance of a capacitor and/or the value of inductance of a coil included in the matching circuit 104. The resonance frequency f is a frequency to be used for generating resonance between the power transmitting apparatus 100 and an apparatus that receives power from the power transmitting apparatus 100.

The resonance frequency f may be a commercial frequency of 50/60 Hz, 10 to several tens MHz, or 13.56 MHz. The resonance frequency f may be a frequency of 6.78 MHz. Alternatively, the resonance frequency f may be a frequency of 100 to 150 KHz.

The matching circuit 104 may further detect a change of the current flowing in the power transmitting antenna 106 and voltage supplied to the power transmitting antenna 106.

When the frequency oscillated by the oscillator 102 is set to the resonance frequency f, the power generated by the power generating unit 103 is supplied to the power transmitting antenna 106 through the matching circuit 104.

The modulating/demodulating circuit 105 is a circuit for performing wireless communication compliant with the NFC standard between the power transmitting apparatus 100 and the electronic apparatus 200. When the power transmitting apparatus 100 transmits a command for controlling the electronic apparatus 200 to the electronic apparatus 200, the modulating/demodulating circuit 105 modulates power generated by the power generating unit 103 on the basis of the protocol compliant with the NFC standard. The modulating/demodulating circuit 105 further has an encoding circuit compliant with a predetermined encoding method.

The modulating/demodulating circuit 105 may demodulate response data from the electronic apparatus 200 in response to the command transmitted to the electronic apparatus 200 or control data from the electronic apparatus 200 with the encoding circuit based on a change of current flowing to the power transmitting antenna 106, which is detected by the matching circuit 104. This allows the modulating/demodulating circuit 105 to receive from the electronic apparatus 200 response data to a command transmitted to the electronic apparatus 200 or control data transmitted from the electronic apparatus 200. The response data or control data received by the modulating/demodulating circuit 105 is supplied to the CPU 107.

The power transmitting antenna 106 is an antenna for outputting power generated by the power generating unit 103 to the outside. The power transmitting apparatus 100 may supply power to the electronic apparatus 200 via the power transmitting antenna 106 and transmit a command to the electronic apparatus 200 via the power transmitting antenna 106. The power transmitting apparatus 100 receives response data corresponding to a command transmitted to the electronic apparatus 200 via the power transmitting antenna 106. The power transmitting apparatus 100 receives a command from the electronic apparatus 200 via the power transmitting antenna 106.

The Central Processing Unit (CPU) 107 controls the power transmitting apparatus 100 by executing a computer program stored in the ROM 108. The CPU 107 controls power to be supplied to the electronic apparatus 200 by controlling the power generating unit 103.

The ROM 108 stores computer program that controls the power transmitting apparatus 100 and information on a parameter regarding the power transmitting apparatus 100, for example. The RAM 109 is a rewritable memory may record a computer program that controls the power transmitting apparatus 100, information on a parameter regarding the power transmitting apparatus 100, for example, data received by the modulating/demodulating circuit 105 from the electronic apparatus 200.

The operating unit 110 provides a user interface for operating the power transmitting apparatus 100. The operating unit 110 may have a power button for the power transmitting apparatus 100 and a mode switching button for the power transmitting apparatus 100. Each of the buttons may be configured by a switch, a touch panel or the like. The CPU 107 controls the power transmitting apparatus 100 in accordance with a user instruction input through the operating unit 110.

The communication unit 111 performs a wireless communication with the electronic apparatus 200 in accordance with a wireless Local Area Network (LAN) standard. The communication unit 111 receives at least one of video data, sound data and a command from the electronic apparatus 200 in accordance with a wireless LAN standard. The communication unit 111 transmits at least one of video data, sound data and a command to the electronic apparatus 200 in accordance with a wireless LAN standard.

Next, with reference to FIG. 2, an example of a configuration of the electronic apparatus 200 will be described. The electronic apparatus 200 has a power receiving antenna 201, a matching circuit 202, a rectifying/smoothing circuit 203, a modulating/demodulating circuit 204, a CPU 205, a ROM 206, a RAM 207, current/voltage detecting unit 208, a regulator 209, a charge control unit 210 and a battery 211. The electronic apparatus 200 further includes a first switching unit 212, a connector 213, a detecting unit 214, a current limiting unit 215, a first communication unit 216, an imaging unit 217, a recording unit 218, an operating unit 220, a second communication unit 221 and a second switching unit 222. The electronic apparatus 200 further includes Low Drop Out regulator 223. The Low Drop Out regulator 223 will be called a "LDO regulator 223" hereinafter.

The power receiving antenna 201 is an antenna for receiving power supplied from the power transmitting apparatus 100. The electronic apparatus 200 may receive power from the power transmitting apparatus 100 via the power receiving antenna 201 and/or perform communication compliant with an NFC standard with the power transmitting apparatus 100. When the electronic apparatus 200 receives a command from the power transmitting apparatus 100 via the power receiving antenna 201, the electronic apparatus 200 transmits response data corresponding to a command received from the power transmitting apparatus 100 to the power transmitting apparatus 100 via the power receiving antenna 201.

The matching circuit 202 is a resonance circuit for performing impedance matching such that the power receiving antenna 201 may resonate at an equal frequency to the resonance frequency f of the power transmitting apparatus 100. The matching circuit 202 includes a variable capacitor, a variable coil and a resistance like the matching circuit 104. The matching circuit 202 controls a value of capacitance of the variable capacitor and a value of inductance of the variable coil included in the matching circuit 202 such that the power receiving antenna 201 may resonate at an equal frequency to the resonance frequency f of the power transmitting apparatus 100. The matching circuit 202 supplies power received by the power receiving antenna 201 to the rectifying/smoothing circuit 203.

The rectifying/smoothing circuit 203 removes a command and noise from the power received by the power receiving antenna 201 and generates direct current power. The rectifying/smoothing circuit 203 supplies the generated direct current power to the regulator 209 through the current/voltage detecting unit 208 and first switching unit 212. The rectifying/smoothing circuit 203 further supplies the generated direct current power to the LDO regulator 223 through the current/voltage detecting unit 208 and second switching unit 222. The rectifying/smoothing circuit 203 supplies a command removed from the power received by the power receiving antenna 201 to the modulating/demodulating circuit 204.

The modulating/demodulating circuit 204 analyzes a command supplied from the rectifying/smoothing circuit 203 in accordance with a communication protocol supported by the power transmitting apparatus 100 and supplies the command analysis result to the CPU 205. When the power transmitting apparatus 100 supplies the first power to the electronic apparatus 200, the CPU 205 controls the modulating/demodulating circuit 204 so as to change the load included in the modulating/demodulating circuit 204 in order to transmit the response data to the command to the power transmitting apparatus 100. When the load included in the modulating/demodulating circuit 204 changes, the current flowing to the power transmitting antenna 106 changes. Thus, the power transmitting apparatus 100 detects the change of the current flowing to the power transmitting antenna 106 to receive the response data to the command from the electronic apparatus 200.

The CPU 205 identifies the command received by the modulating/demodulating circuit 204 based on the analysis result supplied from the modulating/demodulating circuit 204 and controls the electronic apparatus 200 so as to execute the process or operation designated by the command code corresponding to the received command.

The CPU 205 controls the electronic apparatus 200 in accordance with the command received by one of the first communication unit 216 and second communication unit 221. The CPU 205 controls the electronic apparatus 200 by executing a computer program stored in the ROM 206.

The ROM 206 stores a computer program that controls the electronic apparatus 200. The ROM 206 records information regarding the electronic apparatus 200. The RAM 207 is a rewritable memory and may record a computer program that controls the electronic apparatus 200 and/data transmitted from the power transmitting apparatus 100. It is assumed here that the RAM 207 records a predetermined value V1, a predetermined value V2 and a predetermined value V3.

The current/voltage detecting unit 208 detects a voltage of power supplied from the rectifying/smoothing circuit 203. The current/voltage detecting unit 208 detects a current of power supplied from the rectifying/smoothing circuit 203. The current/voltage detecting unit 208 supplies current information indicating the detected current and voltage information indicating the detected voltage to the CPU 205.

The regulator 209 controls in accordance with an instruction from the CPU 205 so as to supply one of power supplied from the rectifying/smoothing circuit 203, power supplied from the battery 211, and power supplied from the external apparatus 400 through the cable 300 to the electronic apparatus 200. In the electronic apparatus 200, while the battery 211 is being charged, the regulator 209 is configured to supply one of power supplied from the rectifying/smoothing circuit 203 and power supplied from the external apparatus 400 through the cable 300 to the electronic apparatus 200.

The regulator 209 supplies power supplied to the regulator 209 to at least the matching circuit 202, rectifying/smoothing circuit 203, modulating/demodulating circuit 204, CPU 205, ROM 206, RAM 207, current/voltage detecting unit 208 and charge control unit 210. The regulator 209 further supplies power supplied to the regulator 209 to at least the first switching unit 212, connector 213, detecting unit 214 and operating unit 220. In this case, the regulator 209 includes a switching regulator and/or a DC converter.

The charge control unit 210 controls charging of the battery 211 if the charge control unit 210 is received power from the regulator 209. The charge control unit 210 detects remaining capacity information indicating a remaining capacity of the battery 211 and supplies it to the CPU 205. While the battery 211 is being charged, the charge control unit 210 further detects an error relating to the charging.

The battery 211 is a battery removably attached to the electronic apparatus 200. The battery 211 is a chargeable secondary battery and may be a lithium ion battery, for example. The battery 211 may be any other than a lithium ion battery.

The first switching unit 212 is a switch for supplying one of power supplied from the rectifying/smoothing circuit 203 and power supplied from the external apparatus 400 through the cable 300 to the regulator 209.

While power is being supplied from the rectifying/smoothing circuit 203 and power is not being supplied from the external apparatus 400, the CPU 205 controls the first switching unit 212 so as to supply power from the rectifying/smoothing circuit 203 to the regulator 209. While power is not being supplied from the rectifying/smoothing circuit 203 and power is being supplied from the external apparatus 400, the CPU 205 controls the first switching unit 212 so as to supply power from the external apparatus 400 to the regulator 209. While power is being supplied from the rectifying/smoothing circuit 203 and power is being supplied from the external apparatus 400, the CPU 205 control the first switching unit 212 so as to supply power from one of the rectifying/smoothing circuit 203 and external apparatus 400 to the regulator 209.

The connector 213 is a connection terminal for connecting the cable 300. The connector 213 has a VBUS terminal, a GND terminal, a D+ terminal and a D− terminal.

The detecting unit 214 detects a potential of the D+ terminal and a potential of the D− terminal. And, the detecting unit 214 detects the type of power supply corresponding to the external apparatus 400. The types of power supply defined in the USB-compliant Battery Charging Specification may include a standard downstream port, a charging downstream port and a dedicated charging port. The detecting unit 214 detects whether or not the external apparatus 400 supports one of the standard downstream port, charging downstream port and dedicated charging port.

The standard downstream port is capable of supplying a maximum 500 mA current to the electronic apparatus 200. Hereinafter, the standard downstream port will be called an "SDP". The charging downstream port is capable of supplying a maximum 1500 mA current to the electronic apparatus 200. Hereinafter, the standard downstream port will be called a "CDP". The dedicated charging port is capable of supplying a maximum 1500 mA current to the electronic apparatus 200. Hereinafter, the dedicated charging port will be called a "DCP".

When the detecting unit 214 detects the type of power supply corresponding to the external apparatus 400, the detecting unit 214 notifies the type of power supply corresponding to the external apparatus 400 to the CPU 205. The detecting unit 214 may detect how much current the external apparatus 400 is capable of supplying to the electronic apparatus 200 in accordance with a USB standard supported by the external apparatus 400 so as to detect the type of power supply corresponding to the external apparatus 400.

When the type of power supply corresponding to the external apparatus 400 is detected, the CPU 205 control the connector 213 such that the D+ terminal and D− terminal of the connector 213 may be connected from the detecting unit 214 to the first communication unit 216. When the type of power supply corresponding to the external apparatus 400 is not detected, the CPU 205 controls the connector 213 such that the D+ terminal and D− terminal of the connector 213 may be connected to the detecting unit 214.

When the connector 213 and the external apparatus 400 are connected through the cable 300 and the type of power supply corresponding to the external apparatus 400 is detected, the CPU 205 sets a first flag f1 to ON. The first flag f1 is data indicating that the electronic apparatus 200 is enabled to receive power from the external apparatus 400. The first flag f1 is recorded in the RAM 207. When the connector 213 and the external apparatus 400 are not connected through the cable 300, the CPU 205 sets the first flag f1 to OFF. When the connector 213 and the external apparatus 400 are connected through the cable 300 and when the type of power supply corresponding to the external apparatus 400 is not detected, the CPU 205 sets the first flag f1 to OFF. The CPU 205 determines whether or not the electronic apparatus 200 can receive power from the external apparatus 400 based on whether or not the first flag f1 is ON. If the first flag f1 is ON, the CPU 205 determines that the electronic apparatus 200 is enabled to receive power from the external apparatus 400. If the first flag f1 is OFF, the CPU 205 determines that the electronic apparatus 200 is disabled to receive power from the external apparatus 400.

For example, when it is detected that the external apparatus 400 does not support the SDP, CDP and DCP, the CPU 205 sets the first flag f1 to OFF even when the connector 213 and the external apparatus 400 are connected through the cable 300.

When it is detected that the external apparatus 400 supports one of the SDP, CDP and DCP, it may be configured such that the CPU 205 may set the first flag f1 to ON after the enumeration between the electronic apparatus 200 and the external apparatus 400 completes.

When the external apparatus 400 and the connector 213 are connected through the cable 300, the current limiting unit 215 limits the current be supplied from a VBUS terminal to the electronic apparatus 200 in accordance with the type of power supply detected by the detecting unit 214. For example, when the external apparatus 400 supports the SDP, the current limiting unit 215 controls such that the current supplied from the VBUS terminal to the electronic apparatus 200 may be equal to or lower than 500 mA. For example, when the external apparatus 400 supports the CDP, the current limiting unit 215 controls the current supplied from the VBUS terminal to the electronic apparatus 200 may be equal to or lower than 1500 mA. For some types of power supply corresponding to the external apparatus 400, the current limiting unit 215 may control such that the current supplied from the VBUS terminal to the electronic apparatus 200 may be equal to or lower than 100 mA. The current controlled by the current limiting unit 215 is supplied to the regulator 209 through the first switching unit 212.

When the first communication unit is connected to the D+ terminal and D− terminal of the connector 213, the first communication unit 216 transmits at least one of video data, sound data and a command to the external apparatus 400 through the cable 300. When the first communication unit is connected to the D+ terminal and D− terminal of the connector 213, the first communication unit 216 receives at least one of video data, sound data and a command from the external apparatus 400 through the cable 300. When the first communication unit is not connected to the D+ terminal and D− terminal of the connector 213, the first communication unit 216 does not transmit at least one of video data, sound data and a command to the external apparatus 400 through the cable 300. When the first communication unit is connected to D+ terminal and D-terminal of the connector 213, the first communication unit 216 does not receive video data, sound data and a command from the external apparatus 400 through the cable 300. The video data and/or sound data received by the first communication unit 216 from the external apparatus 400 through the cable 300 are recorded in the recording medium 219 by the recording unit 218. A command received by the first communication unit 216 from the external apparatus 400 through the cable 300 is supplied to the CPU 205.

The imaging unit 217 has an image pickup device that generates video data from an optical image of a subject, an image processing circuit that performs an image process on video data generated by the image pickup device, and a compressing/decompressing circuit that compresses video data and/or decompresses video data. The imaging unit 217 captures an image of a subject and supplies image data such as a still image or a moving image acquired as a result of the capturing to the recording unit 218. The recording unit 218 records the image data supplied from the imaging unit 217 to the recording medium 219. The imaging unit 217 may further has a component necessary for capturing an image of a subject.

The recording unit 218 records data supplied from one of the imaging unit 217, first communication unit 216 and second communication unit 221 to the recording medium 219. The recording unit 218 reads data from the recording medium 219 and supplies it to one of the first communication unit 216 and second communication unit 221.

The recording medium 219 may be a hard disk, a memory card or the like. The recording medium 219 may be internally included in the electronic apparatus 200 or may be an external recording medium that is removably attached to the electronic apparatus 200.

The operating unit 220 provides a user interface for operating the electronic apparatus 200. The operating unit 220 has a power button for the electronic apparatus 200 and a mode switching button for the electronic apparatus 200. Each of the buttons may be configured by a switch, touch panel or the like. The CPU 205 controls the electronic apparatus 200 in accordance with an instruction by a user input through the operating unit 220.

The second communication unit 221 performs a wireless communication with the power transmitting apparatus 100 under a wireless LAN standard. The second communication unit 221 receives data at least one of video data, sound data and a command from the power transmitting apparatus 100 based on a wireless LAN standard. The second communication unit 221 transmits data at least one of video data, sound data and a command to the electronic apparatus 200 based on a wireless LAN standard. Video data and/or sound data received by the second communication unit 221 from the power transmitting apparatus 100 are recorded to the recording medium 219 by the recording unit 218. A command received by the second communication unit 216 from the power transmitting apparatus 100 is supplied to the CPU 205.

The second switching unit 222 is a switch for supplying power supplied from the rectifying/smoothing circuit 203 to the LDO regulator 223. The CPU 205 controls the second switching unit 222 so as to control whether or not power supplied from the rectifying/smoothing circuit 203 is supplied to the LDO regulator 223.

The LDO regulator 223 supplies power for performing wireless communication compliant with the NFC standard to a device for performing wireless communication compliant with the NFC standard. For example, LDO regulator 223 may supply power supplied to the LDO regulator 223 to, at least, the matching circuit 202, rectifying/smoothing circuit 203, modulating/demodulating circuit 204 and CPU 205. The LDO regulator 223 may include a linear regulator or a series regulator, for example.

The electronic apparatus 200 has a first charging mode and a second charging mode. The first charging mode is a mode for charging the battery 211 by using power supplied from the external apparatus 400 to the electronic apparatus 200. The second charging mode is a mode for charging the battery 211 by using power supplied from the power transmitting apparatus 100 to the electronic apparatus 200.

When the electronic apparatus 200 is in the first charging mode, the CPU 205 controls the first switching unit 212 such that power may be supplied from the external apparatus 400 to the regulator 209. In this case, the CPU 205 controls the first switching unit 212 so as to prevent power supply from the rectifying/smoothing circuit 203 to the regulator 209.

When the electronic apparatus 200 is in the second charging mode, the CPU 205 controls the first switching unit 212 such that power may be supplied from the rectifying/smoothing circuit 203 to the regulator 209. In this case, the CPU 205 controls the first switching unit 212 so as to prevent power supply from the external apparatus 400 to the regulator 209.

The power transmitting antenna 106 and power receiving antenna 201 may be a helical antenna, a loop antenna or a planar antenna such as a meander line antenna.

According to the first embodiment, the process performed by the electronic apparatus 200 is also applicable to a system in which the power transmitting apparatus 100 supplies power by wireless to the electronic apparatus 200 by electromagnetic field coupling. According to the first embodiment, the process performed by the electronic apparatus 200 is also applicable to a system in which an electrode is provided in the power transmitting apparatus 100 and the power transmitting apparatus 100 supplies power to the electronic apparatus 200 by electric field coupling when an electrode is provided in the electronic apparatus 200. According to the first embodiment, the process performed by the electronic apparatus 200 is also applicable to a system in which the power transmitting apparatus 100 supplies power by wireless to the electronic apparatus 200 by electromagnetic induction.

According to the first embodiment, the power transmitting apparatus 100 output power to the electronic apparatus 200 by wireless, and the electronic apparatus 200 receives power from the power transmitting apparatus 100 by wireless. However, the term "wireless" may be replaced by a term "non-contact" or "contactless".

The electronic apparatus 200 illustrated in FIG. 1 receives power from the power transmitting apparatus 100 by wireless and receives power from the external apparatus 400 through the cable 300. In this case, in order to prevent supply of an excessive amount of power, the electronic apparatus 200 may be required to select one of the power transmitting apparatus 100 and external apparatus 400 as the apparatus to supply power to the electronic apparatus 200. Accordingly, the electronic apparatus 200 performs a select process for selecting an apparatus for supplying power to the electronic apparatus 200 from the power transmitting apparatus 100 and external apparatus 400. The electronic apparatus 200 performs a first detection process for detecting whether or not the external apparatus 400 supplies power to the electronic apparatus 200 before the select process is performed. Further, the electronic apparatus 200 performs a second detection process for detecting whether or not the power transmitting apparatus 100 supplies power to the electronic apparatus 200 before the select process is performed.

First Detection Process

Next, the first detection process to be performed by the electronic apparatus 200 according to the first embodiment will be described with reference to the flowchart in FIG. 3. The first detection process may be implemented by execution by the CPU 205 of a computer program stored in the ROM 206.

In S301, the CPU 205 detects whether or not the electronic apparatus 200 and the external apparatus 400 are connected through the cable 300. If the CPU 205 detects that the electronic apparatus 200 and the external apparatus 400 are not connected through the cable 300 (No in S301), the flowchart moves from S301 to S308. If the CPU 205 detects that the electronic apparatus 200 and the external apparatus 400 are connected through the cable 300 (Yes in S301), the flowchart moves from S301 to S302.

In S302, the CPU 205 performs a first authentication process for enabling a supply of power from the external apparatus 400 to the electronic apparatus 200. When the first authentication process is performed, the flowchart moves from S302 to S303.

In S303, the CPU 205 determines whether or not the first authentication process has completed. If the CPU 205 determines that the first authentication process has completed (Yes in S303), the flowchart moves from S303 to S304. If the CPU 205 determines that the first authentication process has not completed (No in S303), the flowchart ends. If the CPU 205 determines that the first authentication process has failed, the flowchart also ends. The first authentication process includes a process for detecting the type of power supply corresponding to the external apparatus 400. The first authentication process may include a process for enumeration with the external apparatus 400.

In S304, the CPU 205 sets the first flag f1 to ON. In this case, the flowchart moves from S304 to S305. The first flag f1 is recorded in the RAM 207.

In S305, the CPU 205 determines whether or not a charging process for charging the battery 211 is to be performed. For example, if the remaining capacity of the battery 211 is not fully charged, the CPU 205 determines to perform a charging process. If the remaining capacity of the battery 211 is fully charged, the CPU 205 determines not to perform a charging process. If the CPU 205 determines not to perform a charging process (No in S305), the flowchart ends. If the CPU 205 determines to perform a charging process (Yes in S305), the flowchart moves from S305 to S306.

In S306, the CPU 205 determines whether or not the electronic apparatus 200 is set to the second charging mode. If the CPU 205 determines that the electronic apparatus 200 is set to the second charging mode (Yes in S306), the flowchart ends. If the CPU 205 determines that the electronic apparatus 200 is not set to the second charging mode (No in S306), the flowchart moves from S306 to S307.

In S307, the CPU 205 sets the electronic apparatus 200 to the first charging mode. The CPU 205 further records information indicating that the electronic apparatus 200 is in the first charging mode to the RAM 207. In this case, this flowchart ends.

If the electronic apparatus 200 is set to the first charging mode in S307, the charge control unit 210 uses power supplied from the external apparatus 400 to the battery 211 via the regulator 209 so as to charge the battery 211. If the electronic apparatus 200 is set to the first charging mode in S307 and when an instruction for performing a predetermined process is input via the operating unit 220, the CPU 205 uses power supplied from the external apparatus 400 so as to perform the predetermined process. For example, if the predetermined process is a process relating to imaging capture, the CPU 205 controls the regulator 209 such that power is supplied from the external apparatus 400 to the imaging unit 217, recording unit 218 and recording medium 219. For example, if the predetermined process is a process for performing wireless communication compliant with a wireless LAN standard, the CPU 205 control the regulator 209 such that power is supplied from the external apparatus 400 to the recording unit 218, recording medium 219 and second communication unit 221. For example, if the predetermined process is a process for performing communication compliant with a USB standard, the CPU 205 control the regulator 209 such that power is supplied from the external apparatus 400 to the recording unit 218, recording medium 219 and first communication unit 216. For example, the predetermined process may be a process relating to reproduction or a process for calling.

In S308, the CPU 205 controls the first communication unit 216 so as not to transmit data to the external apparatus 400. In this case, this flowchart moves from S308 to S309.

In S309, the CPU 205 cancels the electronic apparatus 200 from the setting of the first charging mode. The CPU 205 further deletes the information indicating that the electronic apparatus 200 is in the first charging mode from the RAM 207. In this case, this flowchart moves from S309 to S310.

If the electronic apparatus 200 is cancelled from the first charging mode in S309, the charge control unit 210 stops the charging of the battery 211. While a predetermined process is being performed by the electronic apparatus 200, the CPU 205 in S309 may control the battery 211 and regulator 209 so as to use power supplied from the battery 211 to continue the predetermined process.

In S310, the CPU 205 sets the first flag f1 to OFF. In this case, this flowchart ends.

Having described that the CPU 205 in S308 controls the first communication unit 216 so as not to transmit data to the external apparatus 400, the present invention is not limited thereto. In S308, the CPU 205 may control the first communication unit 216 so as to stop an operation by the first communication unit 216.

Second Detection Process

Figure 4:
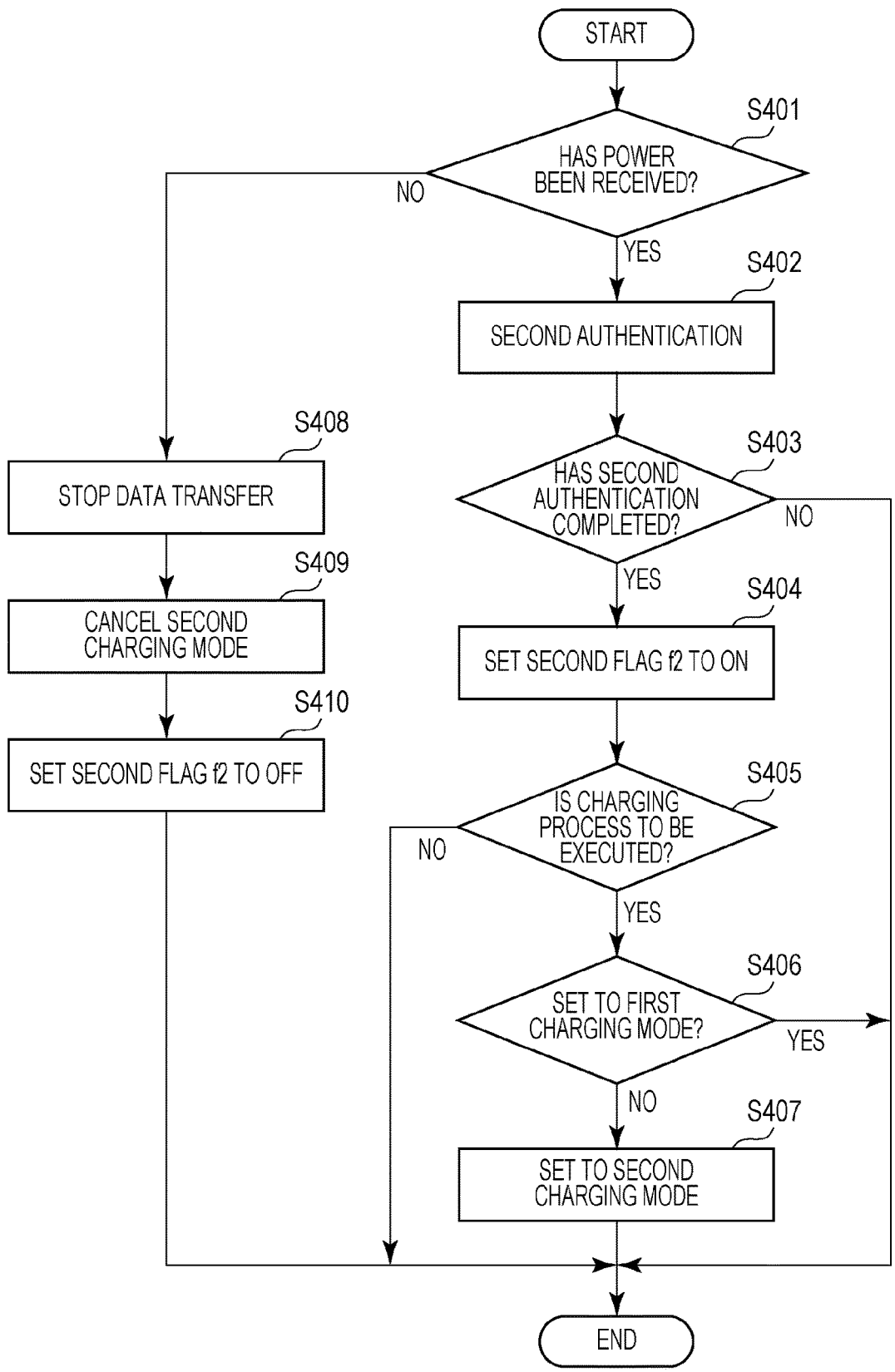
FIG. 4 is a flowchart illustrating an example of a second detection process to be performed by an electronic apparatus according to the first embodiment.

Next, a second detection process to be performed by the electronic apparatus 200 according to the first embodiment will be described with reference to the flowchart in FIG. 4. The second detection process may be implemented by execution by the CPU 205 of a computer program stored in the ROM 206.

In S401, the CPU 205 detects whether or not the electronic apparatus 200 has received power from the power transmitting apparatus 100. If the CPU 205 detects that the electronic apparatus 200 has not received power from the power transmitting apparatus 100 (No in S401), the flowchart moves from S401 to S408. If the CPU 205 detects that the electronic apparatus 200 has received power from the power transmitting apparatus 100 (Yes in S401), the flowchart moves from S401 to S402.

In S402, the CPU 205 performs a second authentication process for enabling a supply of power from the power transmitting apparatus 100 to the electronic apparatus 200. If the second authentication process is performed, the flowchart moves from S402 to S403.

In S403, the CPU 205 determines whether or not the second authentication process has completed. If the CPU 205 determines that the second authentication has completed (Yes in S403), the flowchart moves from S403 to S404. If the CPU 205 determines that the second authentication has not completed (No in S403), the flowchart ends. Like the case where the CPU 205 determines that the second authentication has failed, the flowchart ends. The second authentication process includes a process for notifying identification information of the electronic apparatus 200 to the power transmitting apparatus 100 and/or a processing for notifying a maximum value of the power receivable by the electronic apparatus 200 to the power transmitting apparatus 100. The second authentication process may further include a process for notifying an operation mode of the electronic apparatus 200 to the power transmitting apparatus 100. The second authentication process may further include a process for notifying a remaining capacity of the battery 211 to the power transmitting apparatus 100.

In S404, the CPU 205 sets a second flag f2 to ON. In this case, the flowchart moves from S404 to S405. The second flag f2 is recorded in the RAM 207. The second flag f2 is data indicating whether or not the electronic apparatus 200 is enabled to receive power from the power transmitting apparatus 100. If the second flag f2 is ON, the CPU 205 determines that the electronic apparatus 200 is enabled to receive power from the power transmitting apparatus 100. If the second flag f2 is OFF, the CPU 205 determines that the electronic apparatus 200 is disabled to receive power from the power transmitting apparatus 100.

In S405, the CPU 205 determines whether or not a charging process is to be performed, like S305. If the CPU 205 determines not to perform a charging process (No in S405), the flowchart ends. If the CPU 205 determines to perform a charging process (Yes in S405), the flowchart moves from S405 to S406.

In S406, the CPU 205 determines whether or not the electronic apparatus 200 is set in the first charging mode. If the CPU 205 determines that the electronic apparatus 200 is set in the first charging mode (Yes in S406), the flowchart ends. If the CPU 205 determines that the electronic apparatus 200 is not set in the first charging mode (No in S406), the flowchart moves from S406 to S407.

In S407, the CPU 205 sets the electronic apparatus 200 to the second charging mode. The CPU 205 further records information indicating that the electronic apparatus 200 is in the second charging mode to the RAM 207. In this case, this flowchart ends. If the electronic apparatus 200 is set to the second charging mode in S407, the charge control unit 210 uses power supplied from the power transmitting apparatus 100 to the battery 211 so as to charge the battery 211.

If the electronic apparatus 200 is set to the second charging mode in S407 and when an instruction for perform the predetermined process is input via the operating unit 220, the CPU 205 uses power supplied from the power transmitting apparatus 100 so as to perform the predetermined process.

In S408, the CPU 205 controls the second communication unit 221 not to transmit data to the power transmitting apparatus 100. In this case, this flowchart moves from S408 to S409.

In S409, the CPU 205 cancels the electronic apparatus 200 from the setting of the second charging mode. The CPU 205 further deletes the information indicating that the electronic apparatus 200 is in the second charging mode from the RAM 207. In this case, this flowchart moves from S409 to S410.

If the electronic apparatus 200 is cancelled from the second charging mode in S409, the charge control unit 210 stops the charging of the battery 211. While a predetermined process is being performed by the electronic apparatus 200, the CPU 205 in S409 may control the battery 211 and regulator 209 so as to use power supplied from the battery 211 so as to continue the predetermined process.

In S410, the CPU 205 sets the second flag f2 to OFF. In this case, this flowchart ends.

Select Process

Next, a select process to be performed by the electronic apparatus 200 according to the first embodiment will be described with reference to the flowchart in FIG. 5. The select process may be implemented by execution by the CPU 205 of a computer program store in the ROM 206.

Figure 3:
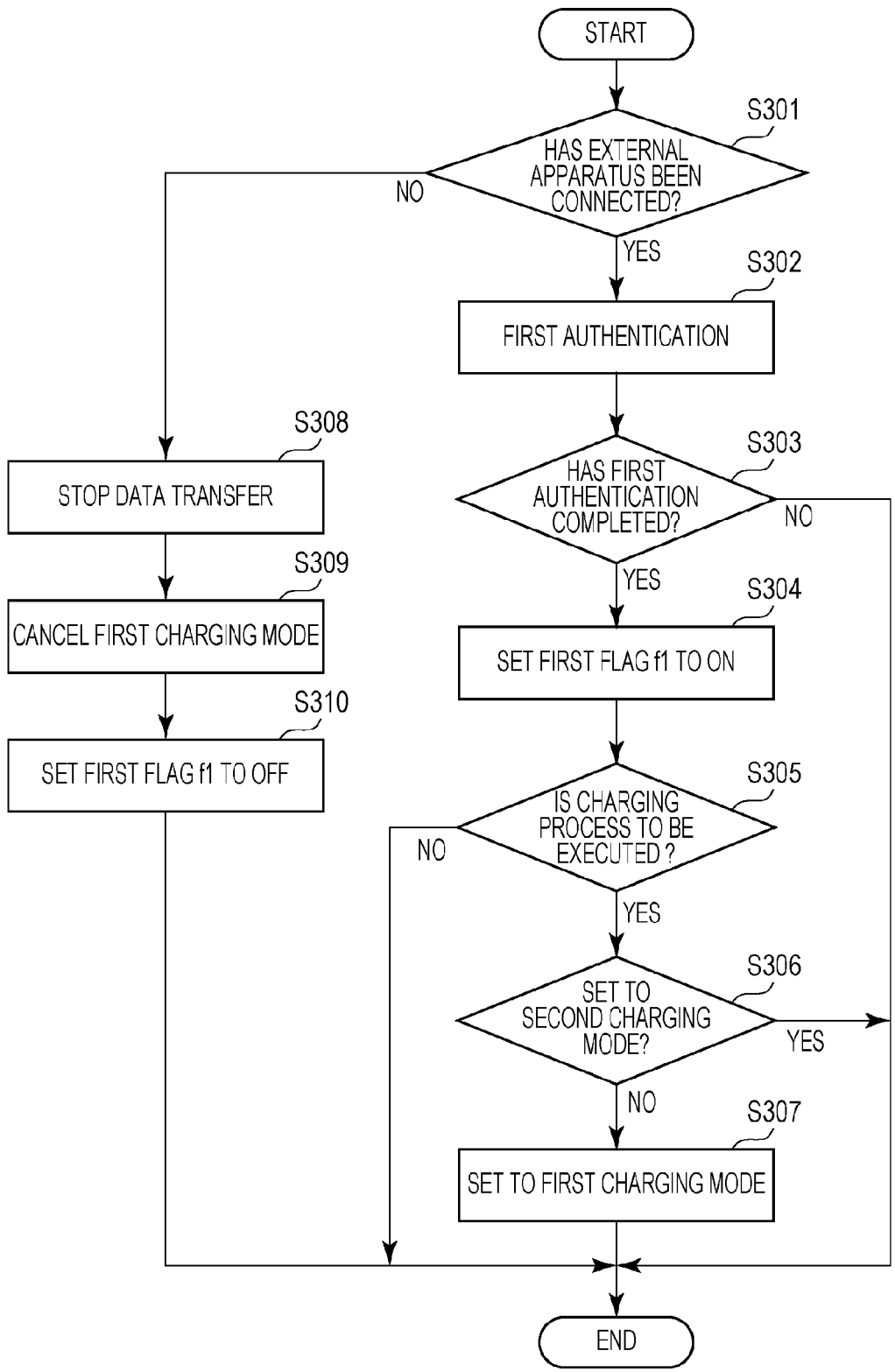
FIG. 3 is a flowchart illustrating an example of a first detection process to be performed by an electronic apparatus according to the first embodiment.

In S501, the CPU 205 performs the first detection process illustrated in FIG. 3. In this case, the flowchart moves from S501 to S502. In S502, the CPU 205 performs the second detection process illustrated in FIG. 4. In this case, the flowchart moves from S502 to S503.

In S503, the CPU 205 determines whether or not the charging of the battery 211 is to be stopped. For example, if the remaining capacity of the battery 211 is not full, the CPU 205 determines not to stop the charging of the battery 211. If the remaining capacity of the battery 211 is full, the CPU 205 determines to stop the charging of the battery 211. For example, when the battery 211 and the electronic apparatus 200 are connected, the CPU 205 determines not to stop the charging of the battery 211. When the battery 211 is removed from the electronic apparatus 200, the CPU 205 determines to stop the charging of the battery 211. If the CPU 205 determines to stop the charging of the battery 211 (Yes in S503), the flowchart moves from S503 to S520. If the CPU 205 determines not to stop charging of the battery 211 (No in S503), the flowchart moves from S503 to S504.

In S504, the CPU 205 determines whether or not the electronic apparatus 200 is set in the first charging mode, like S406. If the CPU 205 determines that the electronic apparatus 200 is set in the first charging mode (Yes in S504), the flowchart moves from S504 to S505. If the CPU 205 determines that the electronic apparatus 200 is not set in the first charging mode (No in S504), the flowchart moves from S504 to S512.

In S505, the CPU 205 determines whether or not the second flag f2 is ON. If the CPU 205 determines that the second flag f2 is ON (Yes in S505), the flowchart moves from S505 to S506. If the CPU 205 determines that the second flag f2 is not ON (No in S505), the flowchart returns from S505 to S501. If the CPU 205 determines that the second flag f2 is OFF, the flowchart also returns from S505 to S501.

In S506, the CPU 205 determines whether or not the first communication unit 216 has transmitted data to the external apparatus 400. If the CPU 205 determine that the first communication unit 216 has transmitted data to the external apparatus 400 (Yes in S506), this flowchart moves from S506 to S521. If the CPU 205 determine that the first communication unit 216 has not transmitted data to the external apparatus 400 (No in S506), this flowchart moves from S506 to S507.

In S507, the CPU 205 detects whether or not the external apparatus 400 is selected by priority as an apparatus for supplying power to the electronic apparatus 200. If the CPU 205 detects that the external apparatus 400 is selected by priority as an apparatus for supplying power to the electronic apparatus 200 (Yes in S507), the flowchart moves from S507 to S521. If the CPU 205 detects that the external apparatus 400 is not selected by priority as an apparatus for supplying power to the electronic apparatus 200 (No in S507), the flowchart moves from S507 to S508. If the external apparatus 400 is not selected by priority as an apparatus for supplying power to the electronic apparatus 200 (No in S507), the CPU 205 detects that the power transmitting apparatus 100 is selected by priority as an apparatus for supplying power to the electronic apparatus 200. Accordingly, the external apparatus 400 is not selected by priority as an apparatus for supplying power to the electronic apparatus 200 (No in S507), the CPU 205 changes the operation mode of the electronic apparatus 200 from the first charging mode to the second charging mode.

In accordance with an instruction from a user which is input via the operating unit 220 to the electronic apparatus 200, the CPU 205 may select one of the power transmitting apparatus 100 and external apparatus 400 by priority as an apparatus for supplying power to the electronic apparatus 200.

If the power received by the electronic apparatus 200 from the power transmitting apparatus 100 is larger than the power received by the electronic apparatus 200 from the external apparatus 400, the CPU 205 may select the power transmitting apparatus 100 by priority as an apparatus for supplying power to the electronic apparatus 200. If the power received by the electronic apparatus 200 from the power transmitting apparatus 100 is not larger than the power received by the electronic apparatus 200 from the external apparatus 400, the CPU 205 may select the external apparatus 400 by priority as an apparatus for supplying power to the electronic apparatus 200.

In S508, the CPU 205 detect whether or not the remaining capacity of the battery 211 is equal to or higher than the predetermined value V3. If the CPU 205 detects that the remaining capacity of the battery 211 is equal to or higher than the predetermined value V3 (Yes in S508), the flowchart moves from S508 to S511. If the CPU 205 detects that the remaining capacity of the battery 211 is not equal to or higher than the predetermined value V3 (No in S508), the flowchart moves from S508 to S509.

The predetermined value V3 is used for controlling whether or not the amount of power received from the power transmitting apparatus 100 is to be used for charging the battery 211. There are a possibility that power transmitting apparatus 100 alternately performs a process of performing wireless communication compliant with the NFC standard while outputting the first power and a process of outputting the second power. In this case, while the power transmitting apparatus 100 is outputting the first power, the power supplied from the power transmitting apparatus 100 may possibly be lower than the power used for a predetermined process. As a result, the electronic apparatus 200 may sometimes stop the predetermined process. In order for the electronic apparatus 200 to continuously perform a predetermined process even while the power transmitting apparatus 100 is outputting the first power, the electronic apparatus 200 may be required to receive power used for performing the predetermined process from the battery 211. Therefore, the predetermined value V3 is a threshold value to be set by the CPU 205 to allow detection of whether or not the battery 211 can supply the power used for performing a predetermined process to the electronic apparatus 200.

For example, the CPU 205 may set the predetermined value V3 in accordance with a consumed power of the electronic apparatus 200 for performing a predetermined process. Alternatively, the CPU 205 may set the predetermined value V3 in accordance with at least one of the first power information and second power information acquired by the electronic apparatus 200 from the power transmitting apparatus 100.

In S509, the CPU 205 determines whether or not a predetermined process is being performed. If the CPU 205 determine that a predetermined process is being performed (Yes in S509), the flowchart moves from S509 to S510. If the CPU 205 determine that a predetermined process is not being performed (No in S509), the flowchart moves from S509 to S511.

When the operation mode of the electronic apparatus 200 is change from the first charging mode to the second charging mode, there is a possibility that the amount of power received from the power transmitting apparatus 100 by the electronic apparatus 200 is lower than the power used for performing a predetermined process and the charging process. In this case, electronic apparatus 200 may sometime stop at least one of a predetermined process and the charging process. Accordingly, the CPU 205 detect whether or not the amount of power received from the power transmitting apparatus 100 by the electronic apparatus 200 is higher than the power used for performing a predetermined process and the charging process before the operation mode of the electronic apparatus 200 is changed from the first charging mode to the second charging mode.

In S510, the CPU 205 determine whether or not the amount of power received from the power transmitting apparatus 100 by the electronic apparatus 200 is higher than the predetermined value V2. If the CPU 205 detects that the power received from the power transmitting apparatus 100 by the electronic apparatus 200 is higher than the predetermined value V2 (Yes in S510), the flowchart moves from S510 to S511. If the CPU 205 detects that the power received from the power transmitting apparatus 100 by the electronic apparatus 200 is not higher than the predetermined value V2 (No in S510), this flowchart returns to S510.

The amount of power received from the power transmitting apparatus 100 by the electronic apparatus 200 may be calculated by the CPU 205 by using current information and voltage information detected by the current/voltage detecting unit 208.

The predetermined value V2 is used for controlling whether or not the operation mode of the electronic apparatus 200 is to be changed from the first charging mode to the second charging mode. Therefore, the predetermined value V2 is a threshold value to be set by the CPU 205 to allow detection of whether or not the power used for performing a predetermined process and the charging process may be supplied from the power transmitting apparatus 100 to the electronic apparatus 200.

For example, the CPU 205 may set the predetermined value V2 in accordance with the value of the second power indicated by the second power information acquired from the power transmitting apparatus 100 and the value of the power received from the power transmitting apparatus 100 by the electronic apparatus 200 when the power transmitting apparatus 100 outputs the second power. In this case, the CPU 205 sets the predetermined value V2 to be equal to or higher than the value of the power received from the power transmitting apparatus 100 by the electronic apparatus 200 and be lower than the value of the second power when the power transmitting apparatus 100 outputs the second power. If a change of the value of the second power output by the power transmitting apparatus 100 is detected, the CPU 205 uses again the second power information acquired from the power transmitting apparatus 100 so as to reset the predetermined value V2.

For example, the CPU 205 may detect a power receiving efficiency and set the predetermined value V2 by using the power receiving efficiency. The term power receiving efficiency refers to a value of power received from the power transmitting apparatus 100 by the electronic apparatus 200 against the power output by the power transmitting apparatus 100. In this case, the CPU 205 uses the second power information acquired from the power transmitting apparatus 100 and the power receiving efficiency so as to predict the power to be received from the power transmitting apparatus 100 by the electronic apparatus 200 when the power transmitting apparatus 100 outputs the second power. Thus, the CPU 205 may use the predicted value to set the predetermined value V2. When a change of the power receiving efficiency is detected, the CPU 205 again uses the power receiving efficiency detected by the power transmitting apparatus 100 so as to reset the predetermined value V2.

For example, the CPU 205 may set the predetermined value V2 in accordance with a consumed power of the electronic apparatus 200 for performing a predetermined process and the charging process. In this case, the CPU 205 sets the predetermined value V2 to be equal to or higher than the value indicating the consumption power of the electronic apparatus 200 and lower than the value of the second power. When a change of the consumed power of the electronic apparatus 200 or a change of a load state the electronic apparatus 200 is detected, the CPU 205 again resets the predetermined value V2.

In S511, the CPU 205 changes the operation mode of the electronic apparatus 200 from the first charging mode to the second charging mode. The CPU 205 further records information indicating that the electronic apparatus 200 is in the second charging mode in the RAM 207 and deletes information indicating that the electronic apparatus 200 is in the first charging mode from the RAM 207. The CPU 205 further controls the charge control unit 210 so as to charge the battery 211 by using power supplied from the power transmitting apparatus 100 to the battery 211. The CPU 205 further performs a predetermined process by using power supplied from the power transmitting apparatus 100. In this case, this flowchart returns from S511 to S501. When the operation mode of the electronic apparatus 200 is changed from the first charging mode to the second charging mode, the CPU 205 controls the charge control unit 210 so as not to charge the battery 211 by using power supplied from the external apparatus 400 to the battery 211. When the operation mode of the electronic apparatus 200 is changed from the first charging mode to the second charging mode, the CPU 205 is configured not to perform a predetermined process by using power supplied from the external apparatus 400.

In S512, the CPU 205 determines whether or not the electronic apparatus 200 is set in the second charging mode, like S306. If the CPU 205 determine that the electronic apparatus 200 is set in the second charging mode (Yes in S512), the flowchart moves from S512 to S513. If the CPU 205 determine that the electronic apparatus 200 is not set in the second charging mode (No in S512), the flowchart returns from S512 to S501.

In S513, the CPU 205 determines whether or not the first flag f1 is ON. If the CPU 205 determines that the first flag f1 is ON (Yes in S513), the flowchart moves from S513 to S514. If the CPU 205 determines that the first flag f1 is not ON (No in S513), the flowchart returns from S513 to S501. If the CPU 205 determines that the first flag f1 is OFF, the flowchart also returns from S513 to S501.

In S514, the CPU 205 determines whether or not an error relating to a supply of power from the power transmitting apparatus 100 has been detected. If the CPU 205 determines that an error relating to the supply of power from the power transmitting apparatus 100 has been detected (Yes in S514), the flowchart moves from S514 to S518. If the CPU 205 determines that an error relating to the supply of power from the power transmitting apparatus 100 has not been detected (No in S514), the flowchart moves from S514 to S515.

An error relating to the supply of power from the power transmitting apparatus 100 may be an error relating to the power transmitting apparatus 100 or an error relating to the electronic apparatus 200. The an error relating to the power transmitting apparatus 100 may be an error when the power transmitting apparatus 100 has a high temperature or an error when the power transmitting apparatus 100 has detected a foreign substance such as metal, for example. An error relating to the electronic apparatus 200 may be an error relating to a wireless communication compliant with the NFC standard or an error when the electronic apparatus 200 is placed at a position that is not suitable for receiving power from the power transmitting apparatus 100, for example. An error relating to the electronic apparatus 200 may be an error when power received from the power transmitting apparatus 100 by the electronic apparatus 200 is rapidly lowered, for example.

In S515, the CPU 205 determines whether or not the second communication unit 221 is transmitting data to the power transmitting apparatus 100. If the CPU 205 determines that the second communication unit 221 is transmitting data to the power transmitting apparatus 100 (Yes in S515), this flowchart returns from S515 to S501. If the CPU 205 determine that the second communication unit 216 is not transmitting data to the power transmitting apparatus 100 (No in S515), this flowchart moves from S515 to S516.

In S516, the CPU 205 detects whether or not the external apparatus 400 is selected by priority as an apparatus for supplying power to the electronic apparatus 200, like S507. If the CPU 205 detects that the external apparatus 400 is not selected by priority as an apparatus for supplying power to the electronic apparatus 200 (No in S516), the flowchart returns from S516 to S501. If the CPU 205 detects that the external apparatus 400 is selected by priority as an apparatus for supplying power to the electronic apparatus 200 (Yes in S516), the flowchart moves from S516 to S517. If the CPU 205 detect that the external apparatus 400 is selected by priority as an apparatus for supplying power to the electronic apparatus 200 (Yes in S516), the CPU 205 changes the operation mode of the electronic apparatus 200 from the second charging mode to the first charging mode.

When the operation mode of the electronic apparatus 200 is changed from the second charging mode to the first charging mode, the electronic apparatus 200 may sometimes be supplied with power from the power transmitting apparatus 100 and the external apparatus 400. In this case, there is a possibility that an excessive amount of power is supplied from the power transmitting apparatus 100 and external apparatus 400 to the electronic apparatus 200.

Accordingly, in order to safely change the operation mode of the electronic apparatus 200 from the second charging mode to the first charging mode, the CPU 205 detects whether or not the power received from the power transmitting apparatus 100 by the electronic apparatus 200 is a low power. This is for preventing supply of an excessive amount of power to the electronic apparatus 200 by changing the operation mode of the electronic apparatus 200 from the second charging mode to the first charging mode after it is detected that the power received from the power transmitting apparatus 100 by the electronic apparatus 200 is the low power.

In S517, the CPU 205 determines whether or not the power received from the power transmitting apparatus 100 by the electronic apparatus 200 is lower than the predetermined value V1. If the CPU 205 detects the power received from the power transmitting apparatus 100 by the electronic apparatus 200 is lower than the predetermined value V1 (Yes in S517), the flowchart moves from S517 to S518. If the CPU 205 detects the power received from the power transmitting apparatus 100 by the electronic apparatus 200 is not lower than the predetermined value V1 (No in S517), the flowchart returns from S517 to S517.

The power received from the power transmitting apparatus 100 by the electronic apparatus 200 may be calculated by the CPU 205 by using current information and voltage information detected by the current/voltage detecting unit 208.

The predetermined value V1 is used for controlling whether or not the operation mode of the electronic apparatus 200 is to be changed from the second charging mode to the first charging mode. The predetermined value V1 is a value lower than the predetermined value V2.

Therefore, the predetermined value V1 is a threshold value set by the CPU 205 to detect whether or not power received from the power transmitting apparatus 100 by the electronic apparatus 200 is low power.

For example, the CPU 205 sets the predetermined value V1 in accordance with the value of the first power indicated by the first power information acquired from the power transmitting apparatus 100 and the value of the power received from the power transmitting apparatus 100 by the electronic apparatus 200 when the power transmitting apparatus 100 outputs the first power. In this case, the CPU 205 sets the predetermined value V1 to be equal to or higher than the value of the power received from the power transmitting apparatus 100 by the electronic apparatus 200 and be lower than the value of the first power when the power transmitting apparatus 100 outputs the first power. If a change of the value of the first power output by the power transmitting apparatus 100 is detected, the CPU 205 uses again the first power information acquired from the power transmitting apparatus 100 so as to reset the predetermined value V1.

For example, the CPU 205 may detect a power receiving efficiency and set the predetermined value V1 by using the power receiving efficiency. In this case, the CPU 205 uses the first power information acquired from the power transmitting apparatus 100 and the power receiving efficiency to predict the power to be received from the power transmitting apparatus 100 by the electronic apparatus 200 when the power transmitting apparatus 100 outputs the first power. Thus, the CPU 205 may use the predicted value to set the predetermined value V1. When a change of the power receiving efficiency is detected, the CPU 205 again uses the power receiving efficiency detected by the power transmitting apparatus 100 so as to reset the predetermined value V1.

For example, the CPU 205 may set the predetermined value V1 in accordance with the consumed power of the electronic apparatus 200 for performing a predetermined process and the charging process. When a change of the consumed power of the electronic apparatus 200 or a change of a load state the electronic apparatus 200 is detected, the CPU 205 again may reset the predetermined value V1.

In S518, the CPU 205 changes the operation mode of the electronic apparatus 200 from the second charging mode to the first charging mode. The CPU 205 further record information indicating that the electronic apparatus 200 is in the first charging mode in the RAM 207 and deletes information indicating that the electronic apparatus 200 is in the second charging mode from the RAM 207. The CPU 205 further controls the charge control unit 210 so as to charge the battery 211 by using power supplied from the external apparatus 400 to the battery 211. The CPU 205 further performs a predetermined process by using power supplied from the external apparatus 400. In this case, this flowchart moves from S518 to S519. When the operation mode of the electronic apparatus 200 is changed from the second charging mode to the first charging mode, the CPU 205 controls the charge control unit 210 so as not to charge the battery 211 by using power supplied from the power transmitting apparatus 100 to the battery 211. When the operation mode of the electronic apparatus 200 is changed from the second charging mode to the first charging mode, the CPU 205 is configured not to perform a predetermined process by using power supplied from the power transmitting apparatus 100.

Before the operation mode of the electronic apparatus 200 is changed from the second charging mode to the first charging mode, the CPU 205 controls the second switching unit 222 such that power supplied from the rectifying/smoothing circuit 203 may be supplied to the LDO regulator 223. When the operation mode of the electronic apparatus 200 is changed from the second charging mode to the first charging mode, no power may sometimes be supplied to the CPU 205 and modulating/demodulating circuit 204. In this case, electronic apparatus 200 is disabled to perform communication compliant with an NFC standard and therefore may neither receive control data nor transmit response data.

In order to prevent this kind of situation, the CPU 205 control the second switching unit 222 such that power may be supplied from the LDO regulator 223 to the CPU 205 and modulating/demodulating circuit 204 and then changes the operation mode of the electronic apparatus 200 from the second charging mode to the first charging mode. After the operation mode of the electronic apparatus 200 is changed to the first charging mode, the CPU 205 detects whether or not power is supplied from the external apparatus 400 to the CPU 205 and modulating/demodulating circuit 204 via the first switching unit 212. If the CPU 205 detects that power is supplied from the external apparatus 400 to the CPU 205 and modulating/demodulating circuit 204 via the first switching unit 212, the CPU 205 controls the second switching unit 222 so as to prevent power supply from the LDO regulator 223 to the CPU 205 and modulating/demodulating circuit 204.

In S519, the CPU 205 performs a wireless communication compliant with the NFC standard in order to transmit to the power transmitting apparatus 100 predetermined data indicating that the power transmitting apparatus 100 is not selected as an apparatus for supplying power to the electronic apparatus 200. In this case, the flowchart returns from S519 to S501.

The predetermined data may include data indicating that the external apparatus 400 is selected as an apparatus for supplying power to the electronic apparatus 200. The predetermined data may include data for causing the power transmitting apparatus 100 to stop output of power. The predetermined data may include data for causing the power transmitting apparatus 100 to stop output of the second power.

In S520, the CPU 205 controls the charge control unit 210 so as to stop charging of the battery 211. In this case, this flowchart ends. The CPU 205 may start the select process in FIG. 5 again after the processing in S520 is performed.

In S521, the CPU 205 performs a wireless communication compliant with the NFC standard in order to transmit to the power transmitting apparatus 100 predetermined data, like S519. In this case, the flowchart returns from S521 to S501.

Having described that the CPU 205 in S506 determines whether or not data is being transmitted to the external apparatus 400, the present invention is not limited thereto. In S506, the CPU 205 may determine whether or not data is being received from the external apparatus 400. In this case, if the CPU 205 determines that data is being received from the external apparatus 400, the flowchart moves from S506 to S521. If the CPU 205 determines that data is not receiving from the external apparatus 400, the flowchart moves from S506 to S507.

Having described that the CPU 205 in S510 determines whether or not the power received from the power transmitting apparatus 100 by the electronic apparatus 200 is higher than the predetermined value V2, the present invention is not limited thereto. For example, in S510, the CPU 205 may determine whether or not the voltage value of power received from the power transmitting apparatus 100 by the electronic apparatus 200 is higher than the predetermined value V2. In this case, the predetermined value V2 is a value of voltage (or voltage value). If the CPU 205 determines that the voltage value of power received from the power transmitting apparatus 100 by the electronic apparatus 200 is higher than the predetermined value V2, the flowchart moves from S510 to S511. If the CPU 205 determines that the voltage value of power received from the power transmitting apparatus 100 by the electronic apparatus 200 is not higher than the predetermined value V2, the flowchart returns from S510 to S510. Alternatively, in S510, for example, the CPU 205 may determine whether or not a current value f power received from the power transmitting apparatus 100 by the electronic apparatus 200 is higher than the predetermined value V2. In this case, the predetermined value V2 is a value of current (current value).

Figure 5:
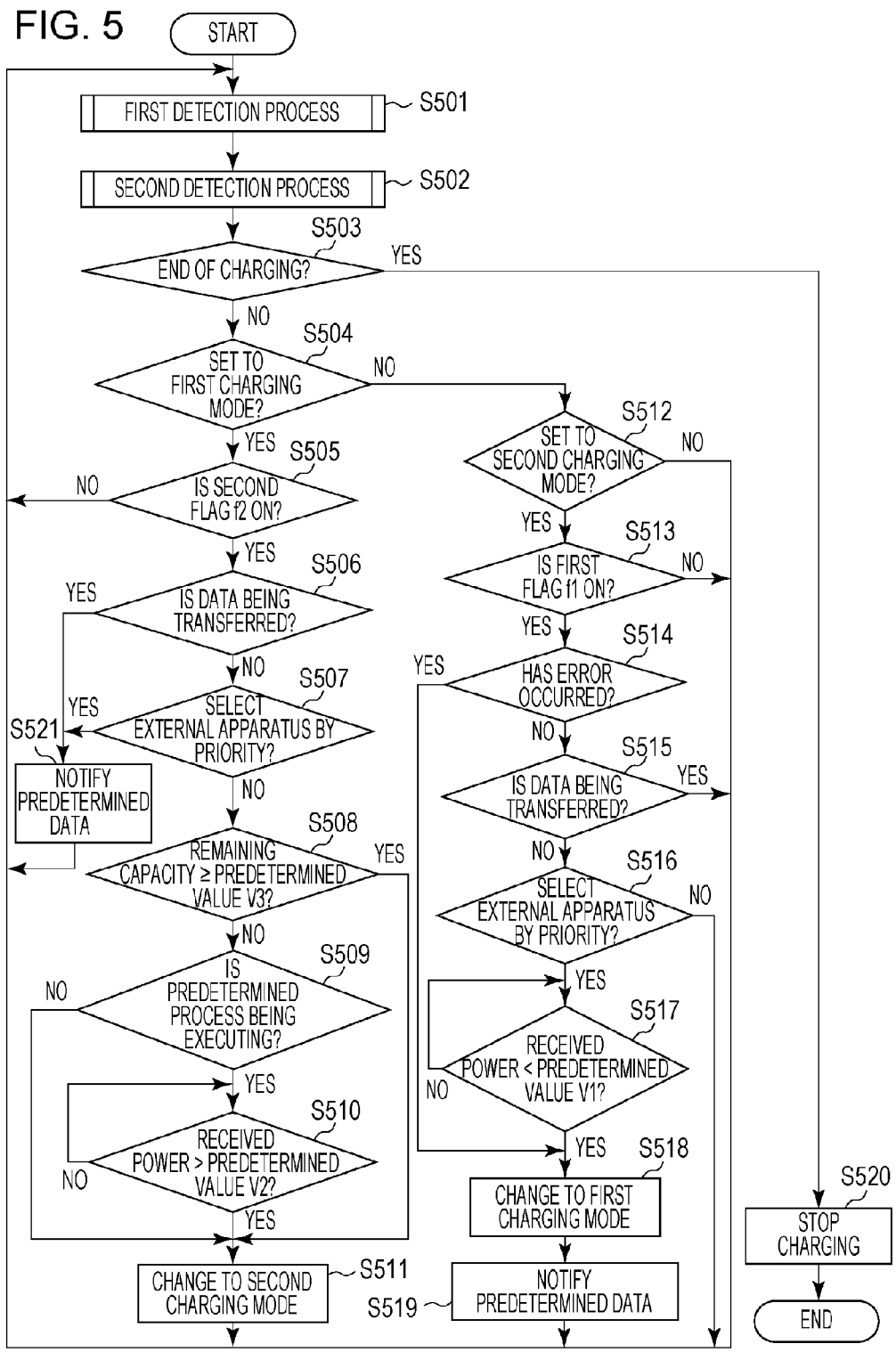
FIG. 5 is a flowchart illustrating an example of a select process to be performed by an electronic apparatus according to the first embodiment.

In the select process in FIG. 5, the first detection process is performed in S501, and the second detection process is them performed in S502. However, the sequence of the processing in S501 and the processing in S502 may be changed to perform the second detection process first and then the first detection process.

In S515, the CPU 205 determines whether or not the second communication unit 221 is transmitting data to the power transmitting apparatus 100. Alternatively, the CPU 205 in S515 may determine whether or not the second communication unit 221 is receiving data from the power transmitting apparatus 100. In this case, if the CPU 205 determines that the second communication unit 221 is receiving data from the external apparatus 400, the flowchart returns from S515 to S501. If the CPU 205 determines that data is not being received from the external apparatus 400, the flowchart moves from S515 to S516.

Having described that the CPU 205 in S517 determines whether or not the power received from the power transmitting apparatus 100 by the electronic apparatus 200 is lower than the predetermined value V1, the present invention is not limited thereto. For example, in S517, the CPU 205 may determine whether or not a voltage value of power received from the power transmitting apparatus 100 by the electronic apparatus 200 is lower than the predetermined value V1. In this case, the predetermined value V1 is a value of voltage (voltage value). If the CPU 205 in this case detects that a voltage value of power received from the power transmitting apparatus 100 by the electronic apparatus 200 is lower than the predetermined value V1, the flowchart moves from S517 to S518. If the CPU 205 detect that the voltage value of power received from the power transmitting apparatus 100 by the electronic apparatus 200 is not lower than the predetermined value V1, the flowchart returns from S517 to S517. For example, in S517, the CPU 205 may determine whether or not a current value of power received from the power transmitting apparatus 100 by the electronic apparatus 200 is lower than the predetermined value V1. In this case, the predetermined value V1 is a value of current (current value).

In this way, when the electronic apparatus 200 according to the first embodiment is supplied with power from the power transmitting apparatus 100 and external apparatus 400, it is configured such that one of the power transmitting apparatus 100 and external apparatus 400 may supply power.

When the operation mode of the electronic apparatus 200 is set in the first charging mode and when the external apparatus 400 is not selected by priority, the electronic apparatus 200 selects the power transmitting apparatus 100 to charge by using power supplied from the power transmitting apparatus 100. This allows selection of an apparatus to receive power so that the electronic apparatus 200 may not be supplied an excessive amount of power from the power transmitting apparatus 100 and external apparatus 400. Moreover, before the operation mode of the electronic apparatus 200 is changed from the first charging mode to the second charging mode, the electronic apparatus 200 detects that power received from the power transmitting apparatus 100 is higher than predetermined value V2 and then changes the operation mode of the electronic apparatus 200 to the second mode. This may prevent a charging process and/or predetermined process to be performed by the electronic apparatus 200 from aborting the change of the operation mode of the electronic apparatus 200.

When the operation mode of the electronic apparatus 200 is set to the second charging mode and when the external apparatus 400 is selected by priority, the electronic apparatus 200 selects the external apparatus 400 and then charges by using power supplied from the external apparatus 400. This may allow the electronic apparatus 200 to select an apparatus to receive power so that the electronic apparatus 200 may not be supplied an excessive amount of power from the power transmitting apparatus 100 and external apparatus 400. Moreover, before the operation mode of the electronic apparatus 200 is change from the second charging mode to the first charging mode, the electronic apparatus 200 detects that the power received from the power transmitting apparatus 100 is lower than the predetermined value V1 and then changes the operation mode of the electronic apparatus 200 to the first mode. This may prevent rapid supply of an excessive amount of power to the electronic apparatus 200 due to a change of the operation mode of the electronic apparatus 200.

Furthermore, when the operation mode of the electronic apparatus 200 is changed, the abort of a wireless communication compliant with the NFC standard between the power transmitting apparatus 100 and the electronic apparatus 200 may also be prevented.

According to the first embodiment, before the operation mode of the electronic apparatus 200 is change from the second charging mode to the first charging mode, the CPU 205 may control the second switching unit 222 such that power supplied from the rectifying/smoothing circuit 203 may be supplied to the LDO regulator 223. However, the present invention is not limited thereto.

For example, before the operation mode of the electronic apparatus 200 is changed from the first charging mode to the second charging mode, the CPU 205 may control the second switching unit 222 such that power supplied from the rectifying/smoothing circuit 203 may be supplied to the LDO regulator 223. In this case, the CPU 205 may control the second switching unit 222 such that power may be supplied from the LDO regulator 223 to the CPU 205 and modulating/demodulating circuit 204 and may then change the operation mode of the electronic apparatus 200 from the first charging mode to the second charging mode. Notably, when the operation mode of the electronic apparatus 200 is changed to the second charging mode, whether or not power is being supplied from the power transmitting apparatus 100 to the CPU 205 and modulating/demodulating circuit 204 via the first switching unit 212 is detected. If power is being supplied from the power transmitting apparatus 100 to the CPU 205 and modulating/demodulating circuit 204 via the first switching unit 212, the CPU 205 control the second switching unit 222 such that power may not be supplied from the LDO regulator 223 to the CPU 205 and modulating/demodulating circuit 204.

The electronic apparatus 200 according to the first embodiment is configured to select in the select process in FIG. 5 whether the power to be used for charging the battery 211 is to be supplied from the power transmitting apparatus 100 or to be supplied from the external apparatus 400. However, the electronic apparatus 200 in the select process in FIG. 5 may select whether the power for operating a predetermined system used for performing a predetermined process is to be supplied from the power transmitting apparatus 100 or to be supplied from the external apparatus 400. The predetermined system may include at least one of the first communication unit 216, imaging unit 217, recording unit 218, and recording medium 219 and second communication unit 221.

In this case, when the electronic apparatus 200 is in the first charging mode, the CPU 205 controls such that the power to be supplied from the external apparatus 400 to the electronic apparatus 200 may be supplied to the predetermined system so as to perform a predetermined process. When the electronic apparatus 200 is in the second charging mode, the CPU 205 controls such that the power to be supplied from the power transmitting apparatus 100 to the electronic apparatus 200 may be supplied to the predetermined system so as to perform a predetermined process. The charging process may not be required here. The predetermined system may have any device if it is a load for performing a predetermined process.

In S305, the CPU 205 determines whether or not a predetermined process is to be performed. If the CPU 205 determines not to perform the predetermined process (No in S305), this flowchart ends. If the CPU 205 determines to perform the predetermined process (Yes in S305), the flowchart moves from S305 to S306. S405 is performed in the same manner as S305. In S503, the CPU 205 determines whether or not the supply of power for the predetermined system is to be stopped. If the CPU 205 determines to stop the supply of power for the predetermined system (Yes in S503), the flowchart moves from S503 to S520. If the CPU 205 determines not to stop the supply of power for the predetermined system (No in S503), the flowchart moves from S503 to S504.

According to the first embodiment, even after the processing in S518 is performed, the electronic apparatus 200 may continuously perform a wireless communication compliant with the NFC standard with the power transmitting apparatus 100. In this case, even when the electronic apparatus 200 and external apparatus 400 are disconnected after the processing in S518 is performed, the electronic apparatus 200 is allowed to request output of the second power to the power transmitting apparatus 100 through a wireless communication compliant with the NFC standard.

Second Embodiment

The descriptions on parts of the second embodiment common to the first embodiment will be omitted, and different parts from the first embodiment will be described.

Next, a select process to be performed by the electronic apparatus 200 according to the second embodiment will be described with reference to the flowchart in FIG. 6. The select process in FIG. 6 may be implemented by execution by the CPU 205 of a computer program stored in the ROM 206.

Figure 6:
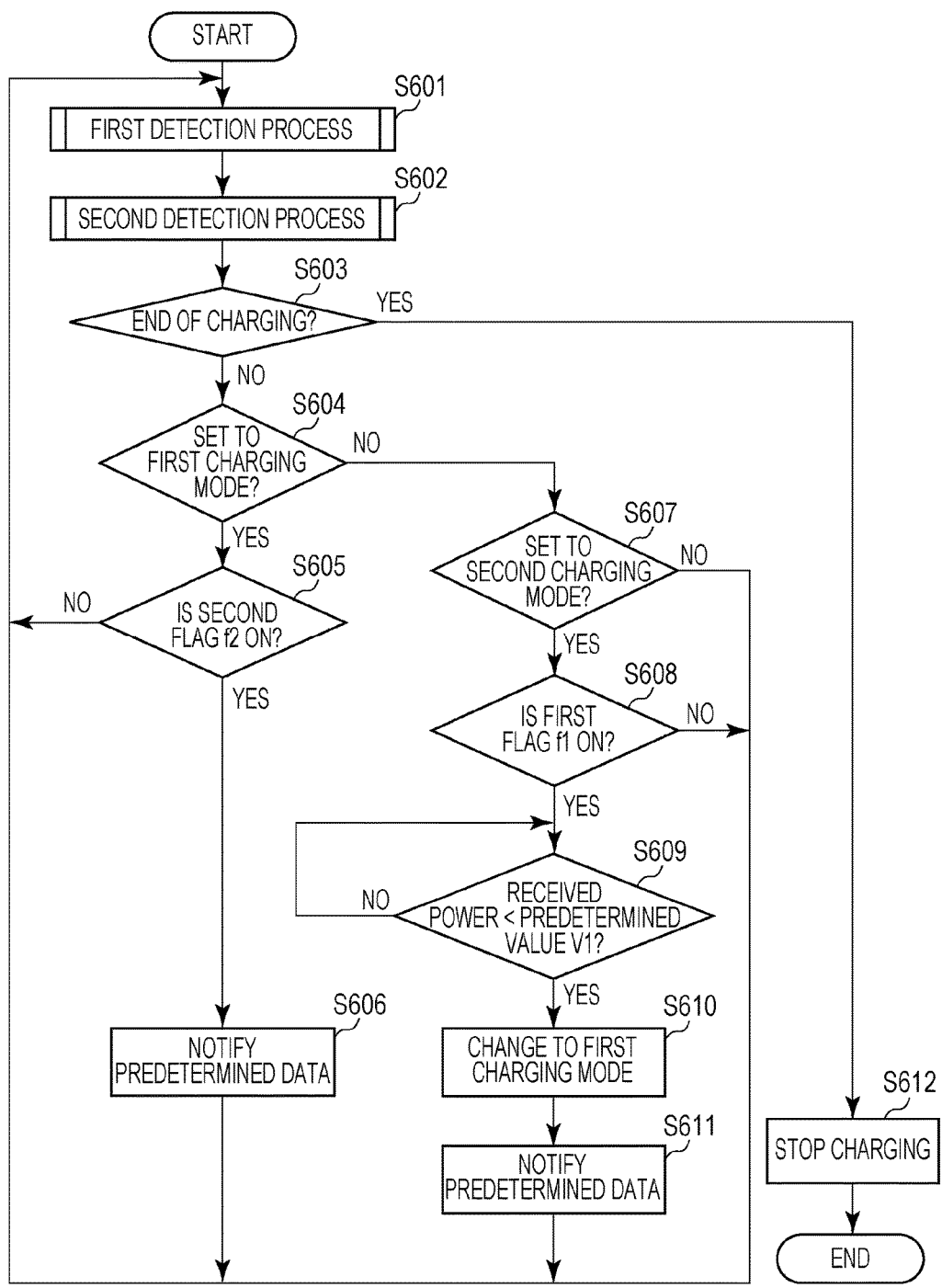
FIG. 6 is a flowchart illustrating an example of a select process to be performed by an electronic apparatus according to a second embodiment.

Because common processing to S501 to S504, S512, S517 to S520 in FIG. 5 is performed in S601 to S604, S607 and S609 to S612 in FIG. 6, the description will be omitted.

In S605, the CPU 205 determines whether or not the second flag f2 is ON. If the CPU 205 determine that the second flag f2 is ON (Yes in S605), the flowchart moves from S605 to S606. If the CPU 205 determines that the second flag f2 is not ON (No in S605), the flowchart returns from S605 to S601. If the CPU 205 determines that the second flag f2 is OFF, the flowchart also returns from S605 to S601.

In S606, the CPU 205 performs a wireless communication compliant with the NFC standard to transmit predetermined data to the power transmitting apparatus 100, like S519. In this case, the flowchart returns from S606 to S601.

In S608, the CPU 205 determines whether or not first flag f1 is ON. If the CPU 205 determines that the first flag f1 is ON (Yes in S608), the flowchart moves from S608 to S609. If the CPU 205 determines that the first flag f1 is not ON (No in S608), the flowchart returns from S608 to S601. If the CPU 205 determines that the first flag f1 is OFF, the flowchart also returns from S608 to S601.

The electronic apparatus 200 according to the second embodiment has the same effect as those of the first embodiment in common processes and configurations according to the first embodiment.

In this way, the electronic apparatus 200 according to the second embodiment is prohibited to select the power transmitting apparatus 100 when the operation mode of the electronic apparatus 200 is set in the first charging mode and even when it is enabled to receive power from the power transmitting apparatus 100. In this case, the electronic apparatus 200 performs charging by using power supplied from the external apparatus 400 until power from the external apparatus 400 becomes not available even though it is enabled to receive power from the power transmitting apparatus 100. The electronic apparatus 200 in this case performs charging by using power supplied from the external apparatus 400 and is prohibited to charge by using power supplied from the power transmitting apparatus 100 until the electronic apparatus 200 and the external apparatus 400 are disconnected even though it is enabled to receive power from the power transmitting apparatus 100. This allows the electronic apparatus 200 to select an apparatus to receive power such that the electronic apparatus 200 may not be supplied an excessive amount of power from the power transmitting apparatus 100 and external apparatus 400.

The electronic apparatus 200 according to the second embodiment may select in the select process in FIG. 6 either supply of power to be used for charging the battery 211 from the power transmitting apparatus 100 or supply of power from the external apparatus 400. However, the electronic apparatus 200 may select in the select process in FIG. 6 either supply of power for operating a predetermined system to be used for performing a predetermined process from the power transmitting apparatus 100 or supply of power from the external apparatus 400.

According to the second embodiment, even after the processing in S610 is performed, the electronic apparatus 200 may continuously perform a wireless communication compliant with the NFC standard with the power transmitting apparatus 100. In this case, even when the electronic apparatus 200 and external apparatus 400 are disconnected after the processing in S610 is performed, the electronic apparatus 200 is allowed to request output of the second power to the power transmitting apparatus 100 through a wireless communication compliant with the NFC standard.

The CPU 205 may select either the select process in FIG. 5 or the select process in FIG. 6 in accordance with the consumed power of the electronic apparatus 200. The CPU 205 may select either the select process in FIG. 5 or the select process in FIG. 6 in accordance with the state of a load on the electronic apparatus 200. Alternatively, the CPU 205 may select either the select process in FIG. 5 or the select process in FIG. 6 in accordance with the remaining capacity of the battery 211.

Having described according to the first and second embodiments that the second communication unit 221 performs a wireless communication with the power transmitting apparatus 100 under a wireless LAN standard, the present invention is not limited thereto. The second communication unit 221 may perform a wireless communication with the power transmitting apparatus 100 under a Bluetooth (registered trademark) standard or a Wireless HD standard. The second communication unit 221 may perform a wireless communication with an apparatus other than the power transmitting apparatus 100.

According to the first and second embodiments, the external apparatus 400 may be a converter that converts power supplied from a commercial power supply to direct current power. The converter may be an AC adapter, for example. When the external apparatus 400 is an AC adapter and the CPU 205 performs the first detection process in FIG. 3, the processing in S308 may be omitted. When the external apparatus 400 is an AC adapter and the CPU 205 performs the first select process in FIG. 5, the processing in S506 may be omitted.

According to the first and second embodiments, the power transmitting apparatus 100 performs a wireless communication compliant with the NFC standard. However, the present invention is not limited thereto. For example, the electronic apparatus 200 may perform a wireless communication compliant with an ISO/IEC 18092 standard for RFID (Radio Frequency IDentification). For example, the electronic apparatus 200 may perform a wireless communication compliant with a MIFARE (registered trademark) standard. For example, the electronic apparatus 200 may perform a wireless communication compliant with a Felica (registered trademark) standard. For example, the electronic apparatus 200 may perform a wireless communication compliant with a Transfer Jet (registered trademark) standard.

The cable 300 may be an interface compliant with a standard other than a Universal Serial Bus (USB) standard. The cable 300 may be an interface compliant with an Ethernet standard.

When the operation mode of the electronic apparatus 200 is changed from the first mode to the second mode, the CPU 205 controls the first switching unit 212 in accordance with the power received from the power transmitting apparatus 100 by the electronic apparatus 200. However, when the power received from the power transmitting apparatus 100 by the electronic apparatus 200 is higher than the predetermined value V2, the first switching unit 212 may automatically switch the connection between the power transmitting apparatus 100 and the electronic apparatus 200 so as to enable power supply from the power transmitting apparatus 100 to the regulator 209.

The CPU 205 controls the first switching unit 212 in accordance with the power received from the power transmitting apparatus 100 by the electronic apparatus 200 so as to change the operation mode of the electronic apparatus 200 from the second mode to the first mode. However, when the power received from the power transmitting apparatus 100 by the electronic apparatus 200 is lower than the predetermined value V1, the first switching unit 212 may automatically switch the connection between the external apparatus 400 and the electronic apparatus 200 such that power may be supplied from the external apparatus 400 to the regulator 209.

The electronic apparatus 200 may receive power from the power transmitting apparatus 100 under a "Qi" standard provided by Wireless Power Consortium (WPC). The electronic apparatus 200 may receive power from the power transmitting apparatus 100 under an NFC standard.

Other Embodiments

An electronic apparatus according to the present invention is not limited to the electronic apparatuses described according to the first and second embodiments. For example, the electronic apparatus according to the present invention may be implemented by a system including a plurality of apparatuses.

Various processes and functions described according to the first and second embodiments may be implemented by a computer program. In this case, a computer program according to the present invention may be executed by a computer (including a CPU or the like) to implement various functions described according to the first and second embodiments.

A computer program according to the present invention may use an Operating System (OS) running on a computer to implement various processes and functions described according to the first and second embodiments.

A computer program according to the present invention may be read from a computer-readable recording medium and be executed by a computer. The computer-readable recording medium may be a hard disk drive, an optical disk, a CD-ROM, a CD-R, a memory card, a ROM or the like. A computer program according to the present invention may be provided from an external apparatus to a computer through a communication interface and be executed by the computer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-023341, filed Feb. 6, 2012, which is hereby incorporated by reference herein in its entirety.

What is claimed is:

1. An electronic apparatus comprising:
a power receiving antenna that receives power from a power transmitting apparatus wirelessly;
a connection unit that connects an external apparatus different from the power transmitting apparatus and receives power from the external apparatus; and
a control unit that performs determining of whether to change a mode of the electronic apparatus between a first mode and a second mode in a case where the connection unit connects the external apparatus, the first mode used for performing a predetermined process and a charging process in parallel using the power received from the external apparatus different from the power transmitting apparatus, the second mode used for performing the predetermined process and the charging process in parallel using power received from the power transmitting apparatus,
wherein, in the second mode, in a case where the determining performed by the control unit has determined to change the mode of the electronic apparatus to the first mode, the control unit monitors the power being received from the power transmitting apparatus via the power receiving antenna before the control unit changes the mode of the electronic apparatus to the first mode, and the control unit does not change the mode of the electronic apparatus to the first mode until the power from the power transmitting apparatus becomes equal to or lower than a first predetermined value,
wherein, in the first mode, in a case where the determining performed by the control unit has determined to change the mode of the electronic apparatus to the second mode, the control unit monitors the power being received from the power transmitting apparatus via the power receiving antenna before the control unit changes the mode of the electronic apparatus to the second mode, and the control unit does not change the mode of the electronic apparatus to the second mode until the power from the power transmitting apparatus becomes equal to or higher than a second predetermined value, and
wherein the first predetermined value is lower than the second predetermined value.

2. The electronic apparatus according to claim 1, wherein the control unit does not perform the predetermined process and the charging process using power received from the power transmitting apparatus after the power received by the power receiving antenna becomes equal to or lower than the first predetermined value if the electronic apparatus is in the second mode.

3. The electronic apparatus according to claim 1, wherein the control unit does not change the mode of the electronic apparatus to the first mode before the power received by the power receiving antenna becomes equal to or lower than the first predetermined value if the electronic apparatus is in the second mode.

4. The electronic apparatus according to claim 1, wherein the control unit does not change the mode of the electronic apparatus to the second mode until the electronic apparatus and the external apparatus are disconnected if the electronic apparatus is in the first mode.

5. The electronic apparatus according to claim 1, wherein the control unit changes the mode of the electronic apparatus to the second mode after the power received by the power receiving antenna becomes higher than the predetermined value if the electronic apparatus is in the first mode.

6. The electronic apparatus according to claim 1, further comprising a first communication unit that communicates with the external apparatus, wherein the control unit does not change the mode of the electronic apparatus to the second mode if the electronic apparatus is in the first mode and the first communication unit transmits data to the external apparatus.

7. The electronic apparatus according to claim 1, further comprising a first communication unit that communicates with the external apparatus, wherein the control unit does not change the mode of the electronic apparatus to the second mode if the electronic apparatus is in the first mode and the first communication unit receives data from the external apparatus.

8. The electronic apparatus according to claim 1, further comprising an error detection unit that detects an error relating to a transmission of power from the power transmitting apparatus, wherein the control unit changes the mode of the electronic apparatus to the first mode if the electronic apparatus is in the second mode and the error detection unit detects the error.

9. The electronic apparatus according to claim 1, further comprising a second communication unit that communicates with the power transmitting apparatus, wherein the second communication unit transmits predetermined data to the power transmitting apparatus if the electronic apparatus is in the first mode, and the predetermined data includes data for indicating that the electronic apparatus uses power received from the external apparatus so as to perform at least one of the predetermined process and the charging process.

10. The electronic apparatus according to claim 1, further comprising a second communication unit that communicates with the power transmitting apparatus, wherein the second communication unit transmits predetermined data to the power transmitting apparatus if the electronic apparatus is in the first mode, and the predetermined data includes data for indicating that the electronic apparatus does not use power received from the power transmitting apparatus so as to perform at least one of the predetermined process and the charging process.

11. The electronic apparatus according to claim 1, further comprising a second communication unit that communicates with the power transmitting apparatus, wherein the second communication unit continues to communicate with the power transmitting apparatus after the electronic apparatus is changed to the first mode from the second mode.

12. The electronic apparatus according to claim 1, further comprising a resonant circuit that sets a frequency of the power receiving antenna to a predetermined frequency.

13. The electronic apparatus according to claim 1, wherein the predetermined process includes at least one of a process relating to wireless communication and a process relating to reproduction.

14. The electronic apparatus according to claim 1, wherein the electronic apparatus includes an apparatus based on a Near Field Communication (NFC) standard.

15. The electronic apparatus according to claim 1, wherein the external apparatus is different from a battery.

16. A method comprising:
receiving power from a power transmitting apparatus wirelessly via a power receiving antenna;
connecting an external apparatus different from the power transmitting apparatus and receiving power from the external apparatus; and
controlling that performs determining of whether to change a mode of an electronic apparatus between a first mode and a second mode in a case where the connecting connects the external apparatus,
the first mode used for performing a predetermined process and a charging process in parallel using the power received from the external apparatus different from the power transmitting apparatus, the second mode used for performing the predetermined process and the charging process in parallel using power received from the power transmitting apparatus,
wherein, in the second mode, in a case where the determining performed by the controlling has determined to change the mode of the electronic apparatus to the first mode, the controlling monitors the power being received from the power transmitting apparatus via the power receiving antenna before the changing the mode of the electronic apparatus to the first mode, and the controlling does not change the mode of the electronic apparatus to the first mode until the power from the power transmitting apparatus becomes equal to or lower than a first predetermined value,
wherein, in the first mode, in a case where the determining performed by the controlling has determined to change the mode of the electronic apparatus to the second mode, the controlling monitors the power being received from the power transmitting apparatus via the power receiving antenna before the controlling changes the mode of the electronic apparatus to the second mode, and the controlling does not change the mode of the electronic apparatus to the second mode until the power from the power transmitting apparatus becomes equal to or higher than a second predetermined value, and
wherein the first predetermined value is lower than the second predetermined value.

17. A non-transitory storage medium that stores a program for causing a computer to execute a method, the method comprising:
receiving power from a power transmitting apparatus wirelessly via a power receiving antenna;
connecting an external apparatus different from the power transmitting apparatus and receiving power from the external apparatus; and
controlling that performs determining of whether to change a mode of an electronic apparatus between a first mode and a second mode in a case where the connecting connects the external apparatus,
the first mode being used for performing a predetermined process and a charging process in parallel using the power received from the external apparatus different from the power transmitting apparatus, the second mode used for performing the predetermined process and the charging process in parallel using power received from the power transmitting apparatus,
wherein, the second mode, in a case where the determining performed by the controlling has determined to change the mode of the electronic apparatus to the first mode, the controlling monitors the power being received from the power transmitting apparatus via the power receiving antenna before the changing the mode of the electronic apparatus to the first mode, and the controlling does not change the mode of the electronic apparatus to the first mode until the power from the power transmitting apparatus becomes equal to or lower than a first predetermined value,
wherein, in the first mode, in a case where the determining performed by the controlling has determined to change the mode of the electronic apparatus to the second mode, the controlling monitors the power being received from the power transmitting apparatus via the power receiving antenna before the controlling changes the mode of the electronic apparatus to the second mode, and the controlling does not change the mode of the electronic apparatus to the second mode until the power from the power transmitting apparatus becomes equal to or higher than a second predetermined value, and
wherein the first predetermined value is lower than the second predetermined value.

18. An electronic apparatus comprising:
a power receiving antenna that receives power from a power transmitting apparatus wirelessly;
a connection unit that connects an external apparatus different from the power transmitting apparatus and receives power from the external apparatus; and
a control unit that performs determining of whether to change a mode of the electronic apparatus to one of a plurality of modes including a first mode and a second mode based on a predetermined condition, the first mode used for performing at least one of a predetermined process and a charging process using the power received from the external apparatus, the second mode used for performing at least one of a predetermined process and a charging process using power received from the power transmitting apparatus,
wherein, in the second mode, in a case where the determining performed by the control unit has determined to change the mode of the electronic apparatus to the first mode, the control unit monitors power being received from the power transmitting apparatus via the power receiving antenna before the control unit changes the mode of the electronic apparatus to the first mode, and the control unit does not change the mode of the electronic apparatus to the first mode until the power from the power transmitting apparatus becomes equal to or lower than a first predetermined value,
wherein, in the first mode, in a case where the determining performed by the control unit has determined to change the mode of the electronic apparatus to the second mode, the control unit monitors the power being received from the power transmitting apparatus via the power receiving antenna before the control unit changes the mode of the electronic apparatus to the second mode, and the control unit does not change the mode of the electronic apparatus to the second mode until the power from the power transmitting apparatus becomes equal to or higher than a second predetermined value, and
wherein the first predetermined value is lower than the second predetermined value.

* * * * *